(12) United States Patent
Manabe et al.

(10) Patent No.: US 9,790,426 B2
(45) Date of Patent: *Oct. 17, 2017

(54) COMPONENTS FOR HIGH-FREQUENCY TECHNOLOGY, AND LIQUID-CRYSTALLINE MEDIA

(75) Inventors: Atsutaka Manabe, Bensheim (DE); Mark Goebel, Darmstadt (DE); Dagmar Klass, Darmstadt (DE); Elvira Montenegro, Weinheim (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 331 days.

This patent is subject to a terminal disclaimer.

(21) Appl. No.: 13/497,806

(22) PCT Filed: Sep. 14, 2010

(86) PCT No.: PCT/EP2010/005640
§ 371 (c)(1),
(2), (4) Date: Mar. 23, 2012

(87) PCT Pub. No.: WO2011/035863
PCT Pub. Date: Mar. 31, 2011

(65) Prior Publication Data
US 2012/0182200 A1 Jul. 19, 2012

(30) Foreign Application Priority Data

Sep. 25, 2009 (DE) .................. 10 2009 042 728
Nov. 4, 2009 (DE) .................. 10 2009 051 892

(51) Int. Cl.
| C09K 19/18 | (2006.01) |
| G02B 27/00 | (2006.01) |
| G02F 1/29 | (2006.01) |
| C09K 19/30 | (2006.01) |

(52) U.S. Cl.
CPC .............. *C09K 19/18* (2013.01); *C09K 19/30* (2013.01); *C09K 19/3001* (2013.01); *G02B 27/0087* (2013.01); *G02F 1/292* (2013.01); *C09K 2019/186* (2013.01); *C09K 2019/188* (2013.01); *C09K 2219/11* (2013.01)

(58) Field of Classification Search
CPC ..................... C09K 19/18; G02B 27/0087
See application file for complete search history.

(56) References Cited

U.S. PATENT DOCUMENTS

| 5,191,339 | A | * | 3/1993 | Riza .............................. 342/372 |
| 5,759,443 | A | | 6/1998 | Funfschilling et al. |
| 5,874,022 | A | * | 2/1999 | Kubo ...................... C09K 19/44 |
| | | | | 252/299.01 |
| 6,149,837 | A | | 11/2000 | Sekine et al. |
| 6,495,066 | B1 | | 12/2002 | Wu |
| 6,623,810 | B2 | | 9/2003 | Sekine et al. |
| 6,849,202 | B2 | | 2/2005 | Sekine et al. |
| 7,135,579 | B2 | | 11/2006 | Sekine et al. |
| 7,361,288 | B2 | | 4/2008 | Lussem et al. |
| 7,846,513 | B2 | | 12/2010 | Sasada |
| 7,981,486 | B2 | | 7/2011 | Sasada |
| 8,557,142 | B2 | * | 10/2013 | Montenegro et al. ... 252/299.63 |
| 2001/0050353 | A1 | | 12/2001 | Sekine et al. |
| 2004/0201797 | A1 | | 10/2004 | Wu et al. |
| 2004/0213923 | A1 | * | 10/2004 | Wu et al. ........................ 428/1.1 |
| 2005/0067605 | A1 | | 3/2005 | Lussem et al. |
| 2006/0097226 | A1 | | 5/2006 | Sasada |
| 2008/0083904 | A1 | * | 4/2008 | Wittek et al. ............ 252/299.67 |
| 2009/0230356 | A1 | | 9/2009 | Sasada |

(Continued)

FOREIGN PATENT DOCUMENTS

| CN | 1413969 A | 4/2003 |
| DE | 199 07 941 A1 | 8/1999 |

(Continued)

OTHER PUBLICATIONS

Galda et al. "A Versatile Palladium-Catalyzed Synthesis of n-Alkyl-Substituted Oligo-p-phenyls". May 1996, Papers, 614-620.*
Ran el al. "Calculating the dielectric anisotropy of nematic liquid crystals: a reinvestigation of the Maier-Meier theory". Jul. 2009, Chinese Physics B, vol. 18 No. 7, 2885-08.*
Zhang et al. "Synthesis and properties of highly birefringent liquid crystalline materials: 2,5-bis(5-alkyl-2-butadinylthiophene-yl) styrene monomers". Jan. 2010, vol. 37 No. 1, 69-76.*
International Search Report of PCT/EP2010/005640 (Dec. 15, 2010).
K. Yokota et al., "Experimental Determination of Molecular Polarizability Anisotropy of Nematogens by Depolarized Rayleigh Light Scattering", Liquid Crystals, vol. 30, No. 6 (2003) pp. 697-700.

(Continued)

*Primary Examiner* — Cynthia H Kelly
*Assistant Examiner* — Anna Malloy
(74) *Attorney, Agent, or Firm* — Millen White Zelano and Branigan, PC; John Sopp; Csaba Henter

(57) ABSTRACT

A component for high-frequency technology or for the microwave range and millimeter wave range of the electromagnetic spectrum. The component contains a liquid-crystal compound of the formula I

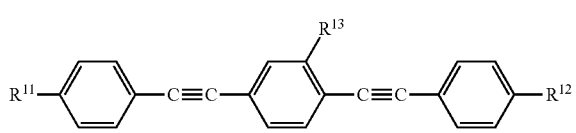

in which the parameters have the respective meanings given in the claims or in the text, or a liquid-crystal medium which itself comprises one or more compounds of this formula I. Also, the corresponding, novel liquid-crystal media, the use and preparation thereof, and the production and use of the components. The components are particularly suitable as phase shifters in the microwave and millimeter wave range, for microwave and millimeter wave array antennae and very particularly for so-called tuneable reflectarrays.

32 Claims, No Drawings

(56) References Cited

U.S. PATENT DOCUMENTS

| | | | |
|---|---|---|---|
| 2009/0278744 A1* | 11/2009 | Kirino et al. | 343/700 MS |
| 2012/0205583 A1* | 8/2012 | Montenegro et al. | 252/299.63 |
| 2013/0292608 A1* | 11/2013 | Manabe et al. | 252/299.62 |

FOREIGN PATENT DOCUMENTS

| | | |
|---|---|---|
| DE | 101 20 024 A1 | 11/2001 |
| DE | 10 2004 029 429 A1 | 2/2005 |
| EP | 1 655 360 A1 | 5/2006 |
| JP | 2000-204052 A | 7/2000 |

OTHER PUBLICATIONS

C. Sekine et al., "High Birefringence Phenylacetylene Liquid Crystals with Low Viscosity", Mol. Cryst. and Liq. Cryst., vol. 364 (2001) pp. 711-718.

C. Sekine et al., "Synthesis and Properties of Some Novel High Birefringence Phenylacetylene Liquid Crystal Materials with Lateral Substituents", Liquid Crystals, vol. 28, No. 9 (2001) pp. 1375-1387.

C.S. Hsu et al., "Synthesis of Laterally Substituted Bistolane Liquid Crystals", Liquid Crystals, vol. 27, No. 2 (2000) pp. 283-287.

S.T. Wu et al., "Physical Properties of Polar Bis-Tolane Liquid Crystals", Jpn. J. Appl. Phys., vol. 39 (2000) pp. L38-L41.

S.T. Wu et al., "Room Temperature Bis-tolane Liquid Crystals", Jpn. J. Appl. Phys., vol. 38 (1999) pp. L286-L288.

S.T. Wu et al., "High Birefringence and Wide Nematic Range Bis-tolane Liquid Crystals", Applied Physics Letters, vol. 74, No. 3 (Jan. 18, 1999) pp. 344-346.

R. Dabrowski et al., "3.3: High Birefringent Liquid Crystalline Materials", IDRC 08 pp. 35-38.

C.Y. Chang et al., "Synthesis of Laterally Substituted α-Methylstilbene-Tolane Liquid Crystals", Liquid Crystals, vol. 35, No. 1 (Jan. 2008) pp. 1-9.

A. Gaebler et al., "Direct Simulation of Material Permittivities by Using an Eigen-Susceptibility Formulation of the Vector Variational Approach", I2MTC 2009—International Instrumentation and Measurement Technology Conference, Singapore (May 5-7, 2009) pp. 463-467.

A. Penirschke et al., "Cavity Perturbation Method for Characterization of Liquid Crystals up to 35 GHz", $34^{th}$ European Microwave Conference (2004) pp. 545-548.

F. Goelden et al., "Novel Tunable Liquid Crystal Phase Shifter for Microwave Frequencies".

F. Dubois et al., "Large Microwave Birefringence Liquid-Crystal Characterization for Phase-Shifter Applications", Japanese Journal of Applied Physics, vol. 47, No. 5 (2008) pp. 3564-3567.

Y.M. Liao et al., "High Birefringence Isothiocyanato Bistolane Liquid Crystals for Display Application", IDMC 2005 pp. 589-592.

Z. Zhang et al., "Synthesis and Properties of Highly Birefringent Liquid-Crystalline Materials: 2,5-bis(5-alkyl-2-butadinylthiophene-yl) Styrene Monomers", Liquid Crystals, vol. 37, No. 1 (Jan. 2010) pp. 69-76.

W.L. Tsai et al., "Mesogenic Properties of Cycloalkylmethyl 4-(4'-octoxybiphenyl-4-carbonyloxy) Benzoate", Liquid Crystals, vol. 31, No. 2 (Feb. 2004) pp. 299-300.

Chinese Office Action dated Apr. 9, 2014 issued in corresponding 201080041956.6 application (pp. 1-7).

* cited by examiner

COMPONENTS FOR HIGH-FREQUENCY TECHNOLOGY, AND LIQUID-CRYSTALLINE MEDIA

AREA OF THE INVENTION

The present invention relates to novel components for high-frequency technology, especially components for high-frequency devices, in particular antennae, especially for the gigahertz range, which are operated in the microwave or millimeter wave range. These components use particular liquid-crystalline, chemical compounds or liquid-crystalline media composed thereof for, for example, the phase shifting of microwaves for tuneable phased-array antennae or for tuneable cells of microwave antennae based on reflectarrays.

PRIOR ART AND PROBLEM TO BE SOLVED

Liquid-crystalline media have long been utilised in electro-optical displays (liquid crystal displays—LCDs) in order to display information.

Bistolan compounds, also known as triphenyldiacetylenes, with an additional alkyl substitution on the central phenylene ring are sufficiently known to the person skilled in the art.

For example, Wu, S.-T., Hsu, C.-S, and Shyu, K.-F., Appl. Phys. Lett., 74 (3), (1999), pages 344-346, disclose various liquid-crystalline bistolan compounds containing a lateral methyl group, of the formula

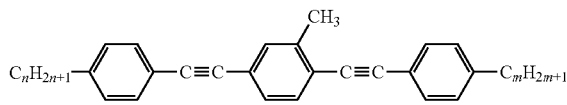

Besides liquid-crystalline bistolan compounds containing a lateral methyl group, Hsu, C. S., Shyu, K. F., Chuang, Y. Y. and Wu, S.-T., Liq. Cryst., 27 (2), (2000), pages 283-287, also disclose corresponding compounds containing a lateral ethyl group and propose the use thereof, inter alia, in liquid crystal optically phased arrays.

Dabrowski, R., Kula, P., Gauza, S., Dziadiszek, J., Urban, S. and Wu, S.-T., IDRC 08, (2008), pages 35-38, disclose dielectrically neutral bistolan compounds with and without a lateral methyl group on the central ring, besides the strongly dielectrically positive isothiocyanatobistolan compounds of the formula

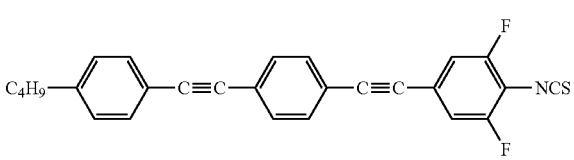

Recently, however, liquid-crystalline media have also been proposed for use in components for microwave technology, as described, for example, in DE 10 2004 029 429 A and in JP 2005-120208 (A).

An industrially valuable application of liquid-crystalline media in high-frequency technology is based on their property that their dielectric properties can be controlled, particularly for the gigahertz range, by a variable voltage. This enables the construction of tuneable antennae which do not contain any moving parts (A. Gaebler, A. Moessinger, F. Goelden, et al., "Liquid Crystal-Reconfigurable Antenna Concepts for Space Applications at Microwave and Millimeter Waves", International Journal of Antennas and Propagation, Volume 2009, Article ID 876989, (2009), pages 1-7, doi:10.1155/2009/876989).

A. Penirschke, S. Müller, P. Scheele, C. Weil, M. Wittek, C. Hock and R. Jakoby: "Cavity Perturbation Method for Characterisation of Liquid Crystals up to 35 GHz", 34th European Microwave Conference—Amsterdam, pp. 545-548, describe, inter alia, the properties of the known single liquid-crystalline substance K15 (Merck KGaA, Germany) at a frequency of 9 GHz.

DE 10 2004 029 429 A describes the use of liquid-crystal media in microwave technology, inter alia in phase shifters. DE 10 2004 029 429 A has already investigated liquid-crystalline media with respect to their properties in the corresponding frequency range.

For use in high-frequency technology, liquid-crystalline media having particular, hitherto rather unusual, uncommon properties, or combinations of properties, are required.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429 A describes the use of liquid-crystal media in microwave technology, inter alia in phase shifters. DE 10 2004 029 429 A has already investigated liquid-crystalline media with respect to their properties in the corresponding frequency range. In addition, it mentions liquid-crystalline media which comprise compounds of the formula

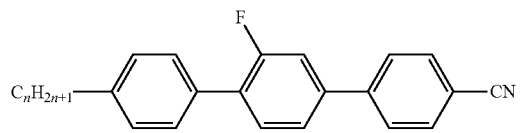

besides compounds of the formulae

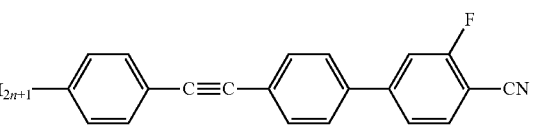

and

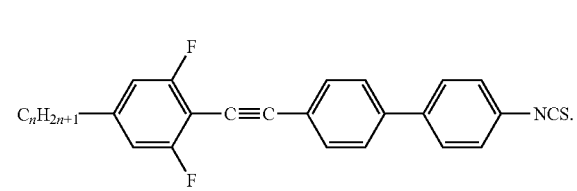

However, the compositions known to date are afflicted with serious disadvantages. Besides other deficiencies, most of them result in disadvantageously high losses and/or inadequate phase shifts or inadequate material quality ($\eta$).

Novel liquid-crystalline media having improved properties are thus necessary. In particular, the loss in the microwave range must be reduced and the material quality improved.

In addition, there is a demand for an improvement in the low-temperature behaviour of the components. Both an improvement in the operating properties and also in the shelf life are necessary here.

Thus, there is a considerable demand for liquid-crystalline media having suitable properties for corresponding practical applications.

Present Invention

Surprisingly, it has now been found that it is possible to achieve components for high-frequency technology which do not have the disadvantages of the prior-art materials, or at least only do so to a considerably reduced extent, if selected, liquid-crystalline compounds or media comprising these compounds are employed.

The present invention thus relates to a component for high-frequency technology or for the microwave range and/or the millimeter range of the electro-magnetic spectrum, characterised in that it comprises a liquid-crystal compound of the formula I or in that it comprises a liquid-crystal medium which comprises one or more compounds of the formula I

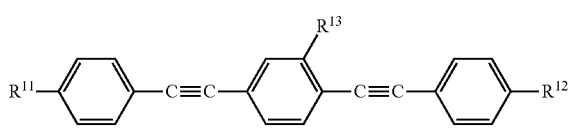

I in which
$R^{11}$ to $R^{13}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cyclo-alkyl, alkylcycloalkyl, cycloalkenyl, alkylcycloalkenyl, alkyl-cycloalkylalkyl or alkylcycloalkenylalkyl, each having up to 15 C atoms,
preferably $R^{11}$ and $R^{12}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms,
particularly preferably $R^{11}$ denotes unfluorinated alkyl having 1 to 7 C atoms or unfluorinated alkenyl, unfluorinated alkenyloxy or unfluorinated alkoxyalkyl, each having 2 to 7 C atoms, and
particularly preferably $R^{12}$ denotes unfluorinated alkyl or unfluorinated alkoxy, each having 1 to 7 C atoms, and
preferably $R^{13}$ denotes unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclo-hexylalkyl having 5 to 15 C atoms, particularly preferably cyclopropyl, cyclobutyl or cyclohexyl and very particularly preferably n-alkyl, particularly preferably methyl, ethyl or n-propyl.

In a first preferred embodiment of the present invention, the component for high-frequency technology comprises a liquid-crystal compound of the formula I or a liquid-crystalline mixture comprising two or more compounds of the formula I.

In the case where the component for high-frequency technology comprises a single liquid-crystal compound of the formula I,
$R^{11}$ and $R^{12}$ in this formula preferably, independently of one another, denote unfluorinated alkyl having 1 to 7 C atoms or unfluorinated alkoxy having 1 to 6 C atoms,
$R^{13}$ in this formula preferably denotes methyl, ethyl or n-propyl, particularly preferably ethyl, and
particularly preferably one of
$R^{11}$ and $R^{12}$ denotes alkyl and the other denotes alkyl or alkoxy,
and very particularly preferably $R^{11}$ and $R^{12}$ have meanings which are different from one another.

In the case where the component for high-frequency technology contains a liquid-crystalline mixture of compounds of the formula I, this mixture consists of two, three, four or more compounds of the formula I, for which the conditions for the individual parameters which were given in the case described above preferably apply in each case.

According to a further preferred embodiment of the present invention, the component for high-frequency technology contains a liquid-crystalline medium comprising
a first component, component A, which consists of one or more compounds of the formula I given above, and
one or more further components selected from the group of components B to E defined below,
a strongly dielectrically positive component, component B, which has a dielectric anisotropy of 10.0 or more,
a strongly dielectrically negative component, component C, which has a dielectric anisotropy of −5.0 or less,
a further component, component D, which has a dielectric anisotropy in the range from more than −5.0 to less than 10.0 and consists of compounds having seven or more five- or six-membered rings, and
a further component, component E, which likewise has a dielectric anisotropy in the range from more than −5.0 to less than 10.0 and consists of compounds having up to six five- or six-membered rings.

Typical examples of five-membered rings are

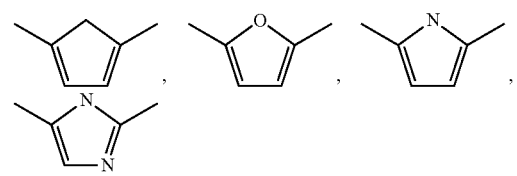

and others.

Typical examples of six-membered rings are

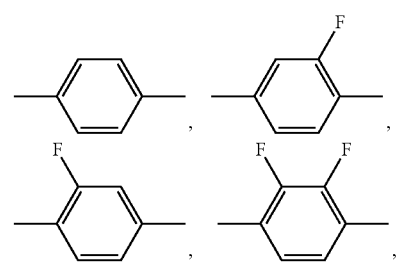

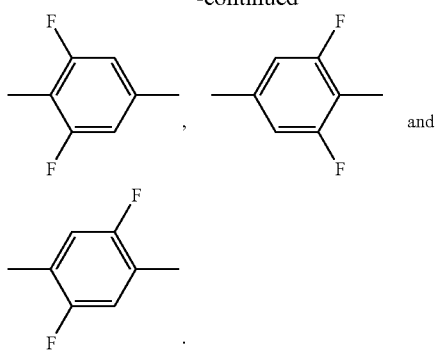

The five- and six-membered rings also include saturated and partially saturated rings, as well as heterocyclic rings.

For the purposes of the present application, condensed ring systems which consist of two of these rings, i.e. two five-membered rings, one five-membered ring or two six-membered rings, such as, for example,

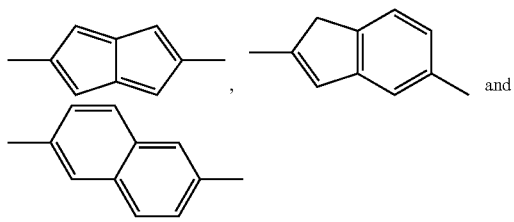

are counted as one of these five- or six-membered rings on assignment of the compounds to component D or E.

Correspondingly, condensed ring systems which consist of a combination of three or more of these rings which are incorporated into the molecule in the longitudinal direction, such as, for example,

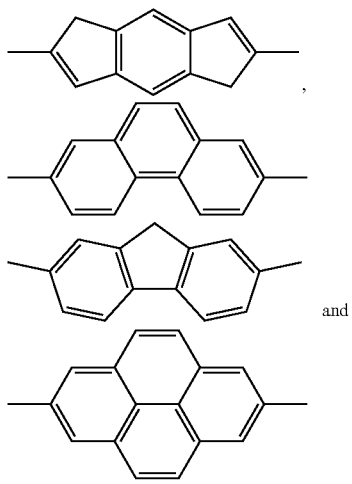

are counted as two of these five- or six-membered rings.

By contrast, condensed ring systems which are incorporated into the molecule in the transverse direction, such as, for example,

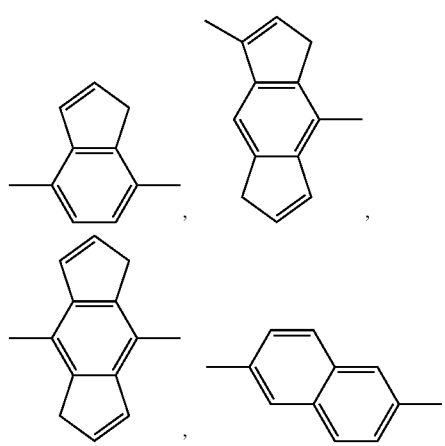

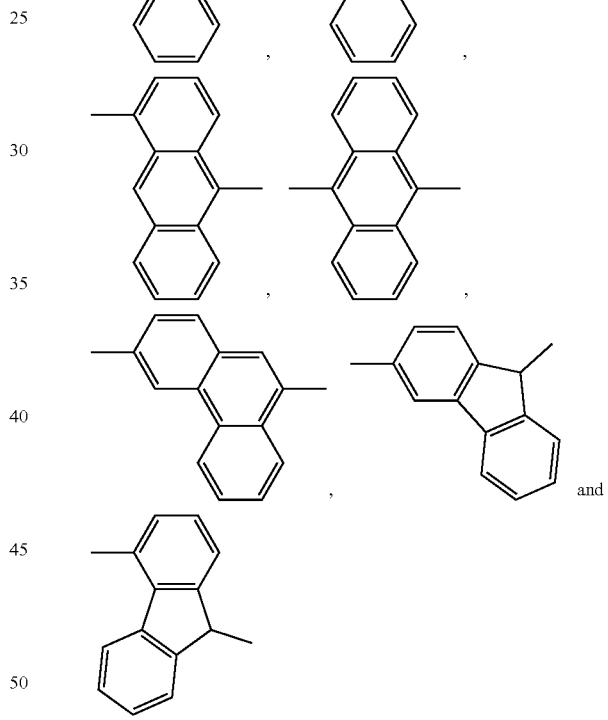

are counted as one of these five- or six-membered rings.

The present invention likewise relates to the directly preceding liquid-crystalline media and to those described below, and to the use thereof in electro-optical displays and in components for high-frequency technology.

In a preferred embodiment of the present invention, the liquid-crystal medium comprises, more preferably predominantly consists of, even more preferably essentially consists of and very particularly preferably completely consists of one or more compounds of the formula I, preferably selected from the group of the compounds of the formulae I-1 to I-3, preferably of the formulae I-1 and/or I-2 and/or I-3, preferably of the formulae I-1 and I-2:

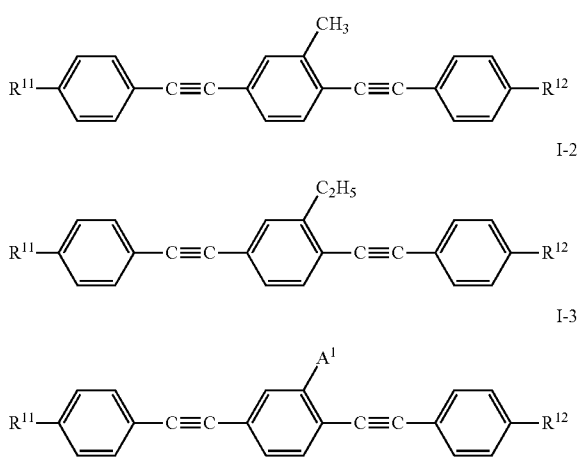

components selected from the group of components A to E. These media preferably comprise component A and component B, or component A, component B and component D and/or E, or component A and component C, or component A, component C and component D and/or E.

These media according to the invention preferably comprise a component B and no component C, or vice versa.

The strongly dielectrically positive component, component B, preferably has a dielectric anisotropy of 20.0 or more, more preferably 25.0 or more, particularly preferably 30.0 or more and very particularly preferably 40.0 or more.

The strongly dielectrically negative component, component C, preferably has a dielectric anisotropy of −7.0 or less, more preferably −8.0 or less, particularly preferably −10.0 or less and very particularly preferably −15.0 or less.

In a preferred embodiment of the present invention, component B comprises one or more compounds selected from the group of the compounds of the formulae IIA to IIC:

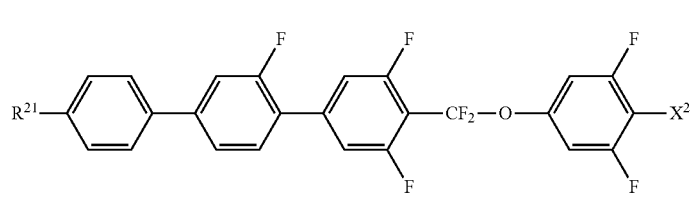

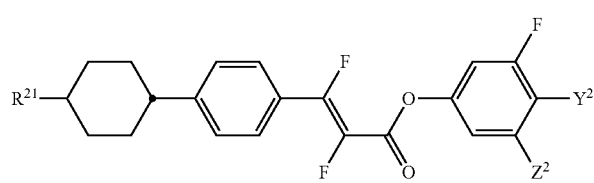

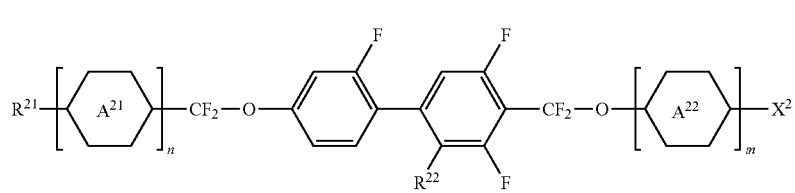

in which $A^1$ denotes cycloalkyl having 3 to 6 C atoms, preferably cyclo-propyl, cyclobutyl or cyclohexyl, particularly preferably cyclopropyl or cyclohexyl and very particularly preferably cyclopropyl, and the other parameters have the respective meanings indicated above for formula I and preferably $R^{11}$ denotes unfluorinated alkyl having 1 to 7 C atoms, and $R^{12}$ denotes unfluorinated alkyl having 1 to 7 C atoms or unfluorinated alkoxy having 1 to 7 C atoms.

Besides component A, these media according to the invention preferably comprise a component selected from the two components B and C and optionally additionally component D and/or E.

These media according to the invention preferably comprise two, three or four, particularly preferably two or three, $R^{21}$ denotes unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, preferably alkyl, particularly preferably n-alkyl, $R^{22}$ denotes H, unfluorinated alkyl or unfluorinated alkoxy, each having 1 to 5, preferably 1 to 3, particularly preferably 3, C atoms, $$-\left\langle A^{21} \right\rangle- \quad \text{to} \quad -\left\langle A^{22} \right\rangle-,$$

independently of one another and, if they occur more than once, these also in each case independently of one another, denote

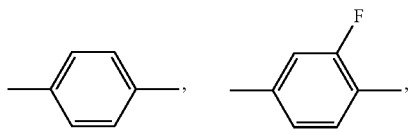

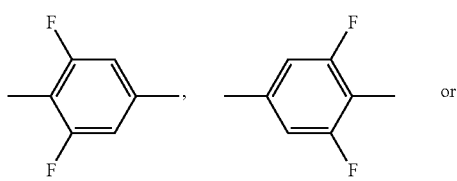

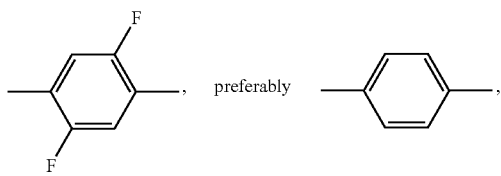, preferably

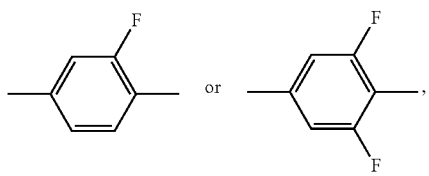, n and m, independently of one another, denote 1 or 2, preferably (n+m) denotes 3 or 4, and particularly preferably n denotes 2, $X^2$ denotes F, Cl, —$CF_3$ or —$OCF_3$, preferably F or Cl, particularly preferably F, $Y^2$ denotes F, Cl, —$CF_3$, —$OCF_3$ or CN, preferably CN, and $Z^2$ denotes H or F.

Preferred compounds of the formula IIA are the compounds of the corresponding sub-formula IIA-1

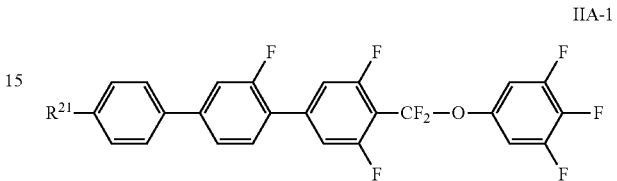

IIA-1 in which $R^{21}$ has the meaning given above.

Preferred compounds of the formula IIB are the compounds of the corresponding sub-formulae IIB-1 and IIB-2:

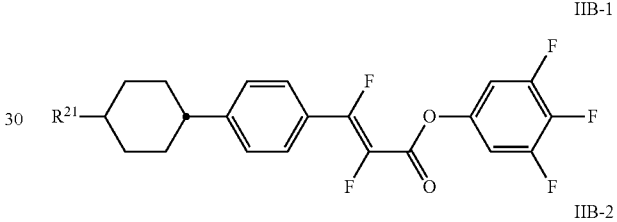

IIB-1

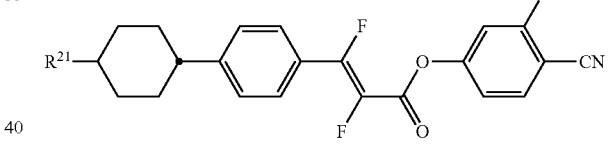

IIB-2 in which $R^{21}$ has the meaning given above.

Preferred compounds of the formula IIC are the compounds of the corresponding sub-formulae IIC-1 and IIC-2:

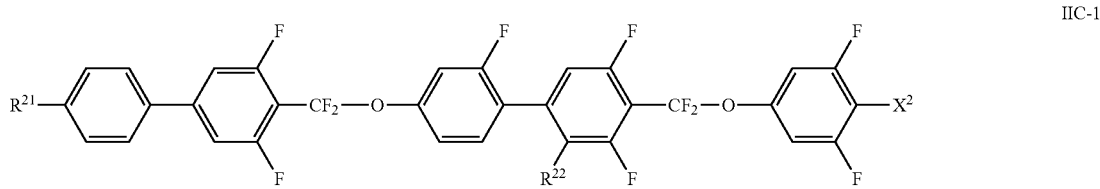

IIC-1

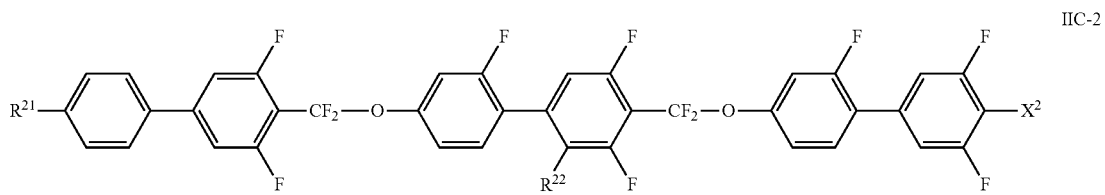

IIC-2 in which $R^{21}$, $R^{22}$ and $X^2$ have the respective meanings given above.

In a preferred embodiment of the present invention, component C comprises one or more compounds selected from the group of the compounds of the formulae IIIA and IIIB:

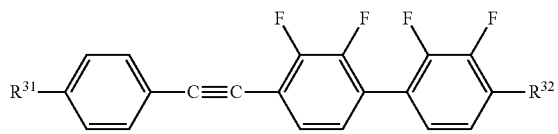

IIIA

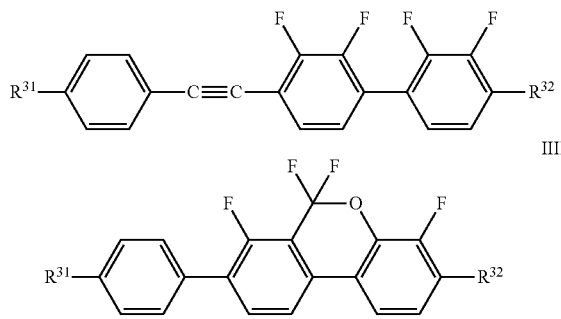

IIIB in which
$R^{31}$ and $R^{32}$, independently of one another, have the meanings indicated above for $R^{21}$ under formula IIA,
and preferably
$R^{31}$ denotes $C_nH_{2n+1}$ or $CH_2$=CH—$(CH_2)_Z$ and
$R^{32}$ denotes $C_mH_{2m+1}$ or O—$C_mH_{2m+1}$ or $(CH_2)_Z$—CH=$CH_2$,
and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and O—$C_mH_{2m+1}$).

Preferred compounds of the formula IIIB are the compounds of the sub-formulae IIIB-1 and IIIB-2:

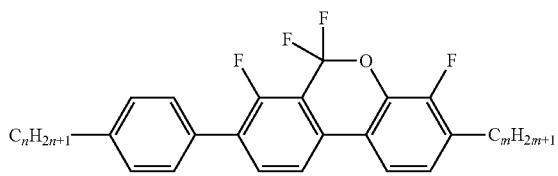

IIIB-1

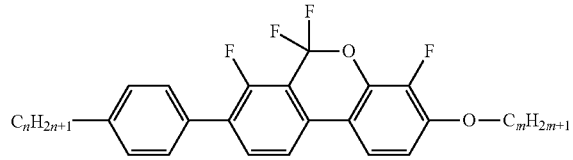

IIIB-2 in which
n and m each have the meanings given above for formula IIIB and preferably, independently of one another, denote an integer in the range from 1 to 7.

In a preferred embodiment of the present invention, component D comprises one or more compounds of the following formula IV:

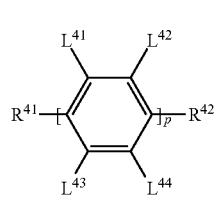

IV in which
$R^{41}$ and $R^{42}$, independently of one another, have one of the meanings indicated above for $R^{11}$ under formula I,
$L^{41}$ to $L^{44}$ on each appearance, in each case independently of one another, denote H, alkyl having 1 to 5 C atoms, F or Cl, and
P denotes an integer in the range from 7 to 14, preferably 8 to 12 and particularly preferably 9 to 10,
and preferably
at least two of the substituents
$L^{41}$ to $L^{44}$ present have a meaning other than H, and
$R^{31}$ denotes $C_nH_{2n+1}$ or $CH_2$=CH—$(CH_2)_Z$ and
$R^{32}$ denotes $C_mH_{2m+1}$ or O—$C_mH_{2m+1}$ or $(CH_2)_Z$—CH=$CH_2$,
and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

In a preferred embodiment of the present application, the liquid-crystal medium additionally comprises a further component, component E, which preferably consists of one or more compounds selected from the group of the compounds of the formulae V to IX:

V

VI

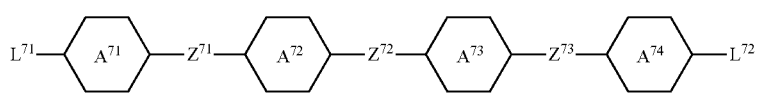

VII

-continued

   VIII

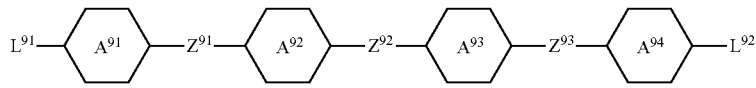   IX in which $L^{51}$ denotes $R^{51}$ or $X^{51}$, $L^{52}$ denotes $R^{52}$ or $X^{52}$, $R^{51}$ and $R^{52}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{51}$ and $X^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

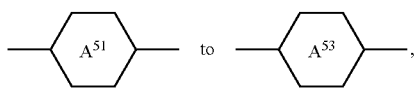

independently of one another, denote

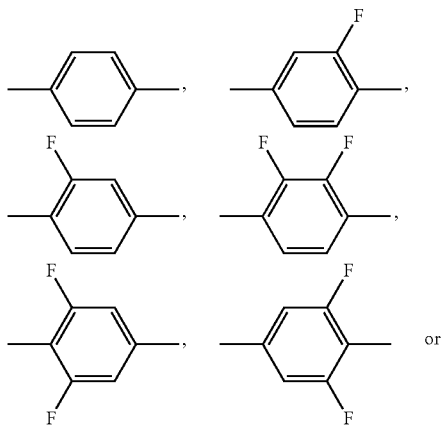

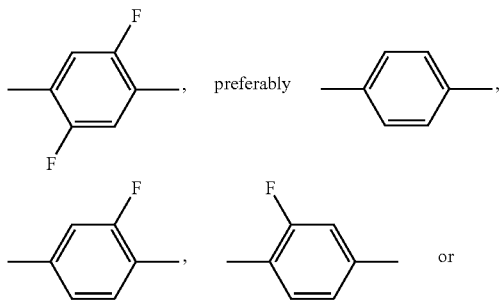

-continued

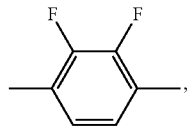

$L^{61}$ denotes $R^{21}$ and, in the case where $Z^{61}$ and/or $Z^{62}$ denote trans-CH=CH— or trans-CF=CF—, alternatively denotes $X^{21}$, $L^{62}$ denotes $R^{62}$ and, in the case where $Z^{61}$ and/or $Z^{62}$ denote trans-CH=CH— or trans-CF=CF—, alternatively denotes $X^{62}$, $R^{61}$ and $R^{62}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{61}$ and $X^{62}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, preferably —NCS, one of $Z^{61}$ and $Z^{62}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

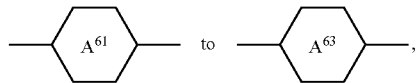

independently of one another, denote

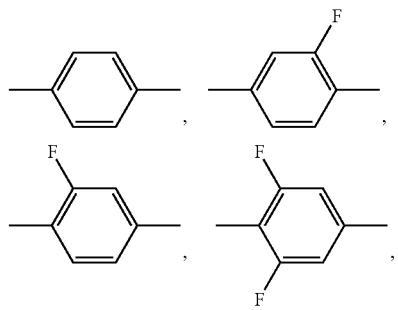

-continued

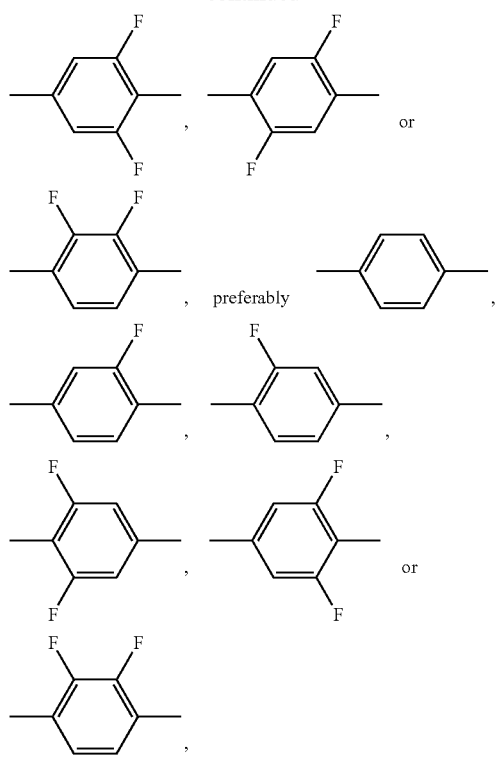

$L^{71}$ denotes $R^{71}$ or $X^{71}$, $L^{72}$ denotes $R^{72}$ or $X^{72}$, $R^{71}$ and $R^{72}$, independently of one another, denote H, unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{71}$ and $X^{72}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{71}$ to $Z^{73}$, independently of one another, denote trans-CH=CH—, trans-CF=CF—, —C≡C— or a single bond, preferably one or more of them denote a single bond, particularly preferably all denote a single bond, and

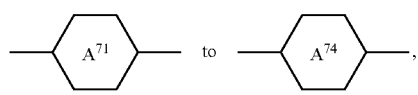

independently of one another, denote

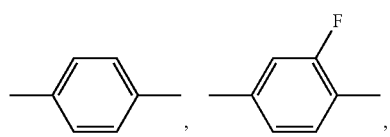

-continued

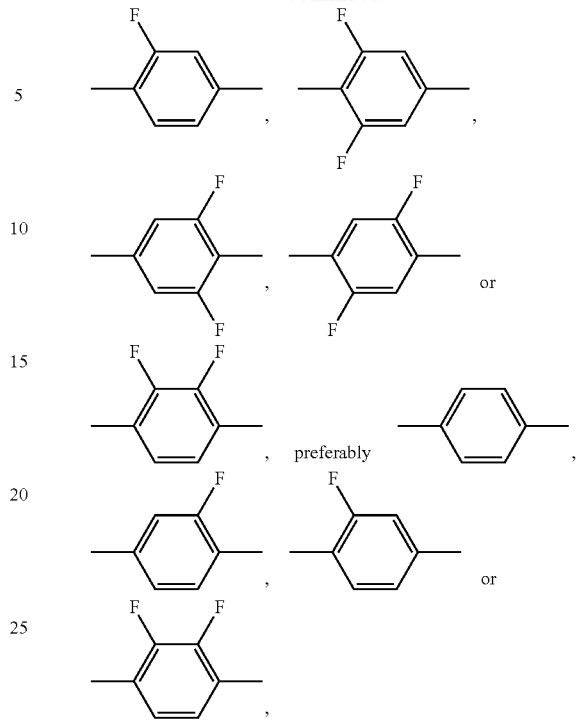

$R^{81}$ and $R^{82}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, one of $Z^{81}$ and $Z^{82}$ denotes trans-CH=CH—, trans-CF=CF— or —C≡C— and the other, independently thereof, denotes trans-CH=CH—, trans-CF=CF— or a single bond, preferably one of them denotes —C≡C— or trans-CH=CH— and the other denotes a single bond, and

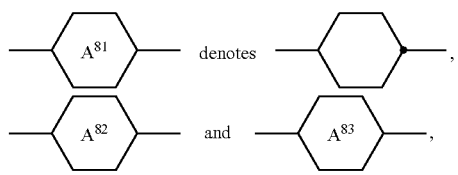

independently of one another, denote

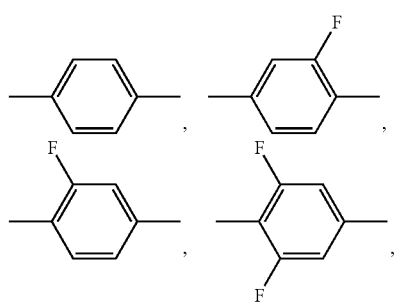

-continued

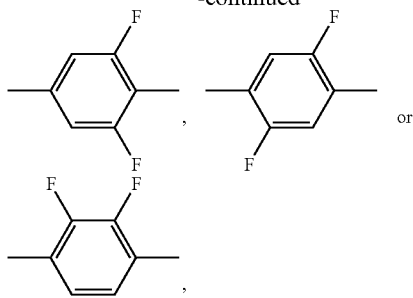

$L^{91}$ denotes $R^{91}$ or $X^{91}$,
$L^{92}$ denotes $R^{92}$ or $X^{92}$,
$R^{91}$ and $R^{92}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl,
$X^{91}$ and $X^{92}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and
$Z^{91}$ to $Z^{93}$, independently of one another, denote trans-CH=CH—, trans-CF=CF—, —C≡C— or a single bond, preferably one or more of them denotes a single bond, and particularly preferably all denote a single bond,

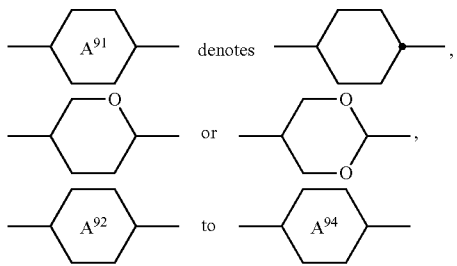

independently of one another, denote

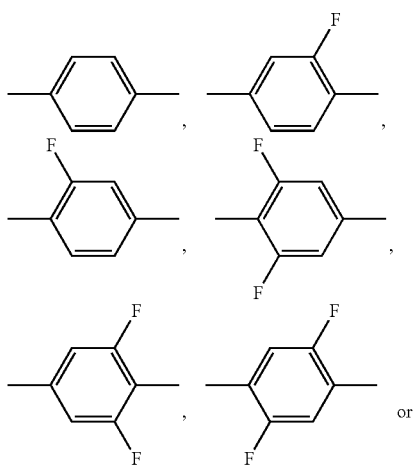

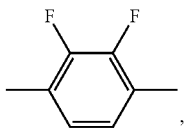

and where compounds of the formula IIIA are excluded from the compounds of the formula VI.

In a preferred embodiment of the present invention, the liquid-crystal medium comprises, more preferably predominantly consists of, even more preferably essentially consists of and very particularly preferably completely consists of one or more compounds of the formula V, preferably selected from the group of the compounds of the formulae V-1 to V-3, preferably of the formulae V-1 and/or V-2 and/or V-3, preferably of the formulae V-1 and V-2:

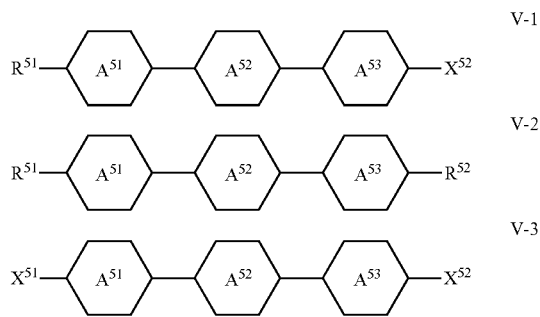

in which the parameters have the respective meanings indicated above for formula V and preferably
$R^{51}$ denotes unfluorinated alkyl having 1 to 7 C atoms or unfluorinated alkenyl having 2 to 7 C atoms,
$R^{52}$ denotes unfluorinated alkyl having 1 to 7 C atoms or unfluorinated alkenyl having 2 to 7 C atoms or unfluorinated alkoxy having 1 to 7 C atoms,
$X^{51}$ and $X^{52}$, independently of one another, denote F, Cl, —OCF$_3$, —CF$_3$, —CN, —NCS or —SF$_5$, preferably F, Cl, —OCF$_3$ or —CN.

The compounds of the formula V-1 are preferably selected from the group of the compounds of the formulae V-1a to V-1d, more preferably these compounds of the formula V predominantly consist, even more preferably essentially consist and very particularly preferably completely consist thereof:

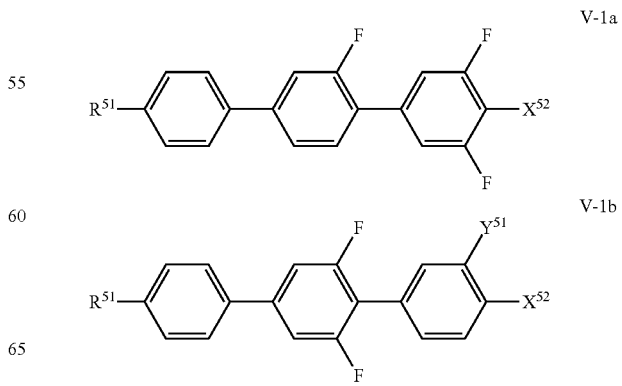

-continued

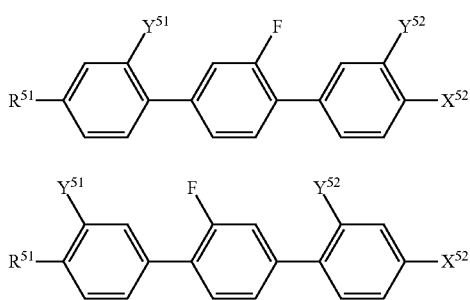

in which the parameters have the respective meanings indicated above for formula V-1 and in which $Y^{51}$ and $Y^{52}$, in each case independently of one another, denote H or F, and preferably $R^{51}$ denotes alkyl or alkenyl, and $X^{51}$ denotes F, Cl or —$OCF_3$.

The compounds of the formula V-2 are preferably selected from the group of the compounds of the formulae V-2a to V-2e and/or from the group of the compounds of the formulae V-2f and V-2g, more preferably these compounds of the formula V predominantly consist, even more preferably essentially consist and very particularly preferably completely consist thereof:

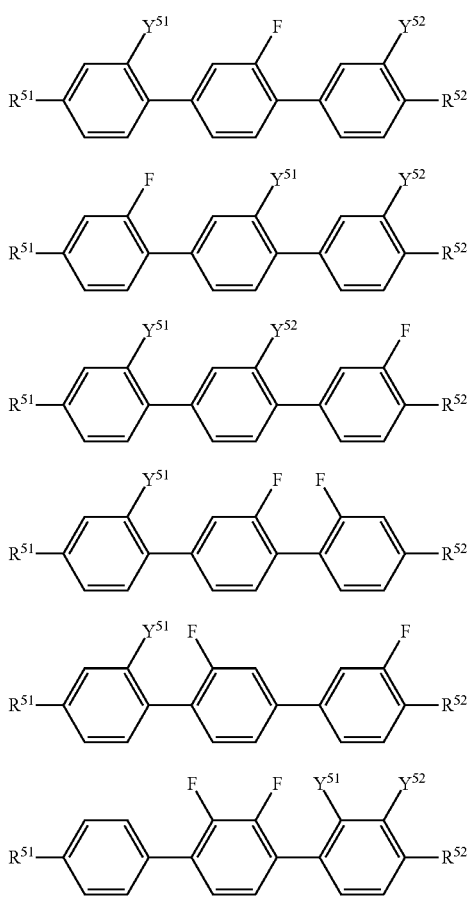

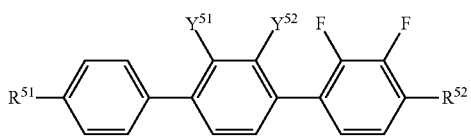

where in each case the compounds of the formula V-2a are excluded from the compounds of the formulae V-2b and V-2c, the compounds of the formula V-2b are excluded from the compounds of the formula V-2c and the compounds of the formula V-2e are excluded from the compounds of the formula V-2f, and in which the parameters have the respective meanings indicated above for formula V-1 and in which $Y^{51}$ and $Y^{52}$, in each case independently of one another, denote H or F, and preferably $R^{51}$ denotes alkyl or alkenyl, $X^{51}$ denotes F, Cl or —$OCF_3$, and preferably one of $Y^{51}$ and $Y^{52}$ denotes H and the other denotes H or F, preferably likewise denotes H.

The compounds of the formula V-3 are preferably compounds of the formula V-3a:

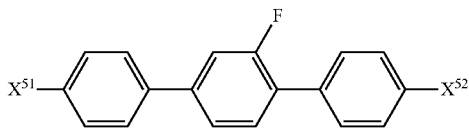

in which the parameters have the respective meanings indicated above for formula V-1 and in which preferably $X^{51}$ denotes F, Cl, preferably F, $X^{52}$ denotes F, Cl or —$OCF_3$, preferably —$OCF_3$.

In an even more preferred embodiment of the present invention, the compounds of the formula V are selected from the group of the compounds V-1a to V-1d, preferably selected from the group of the compounds V-1c and V-1d, more preferably these compounds of the formula V predominantly consist, even more preferably essentially consist and very particularly preferably completely consist thereof:

The compounds of the formula V-1a are preferably selected from the group of the compounds of the formulae V-1a-1 and V-1a-2, more preferably these compounds of the formula V predominantly consist, even more preferably essentially consist and very particularly preferably completely consist thereof:

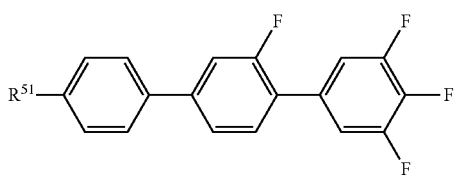

V-1a-2

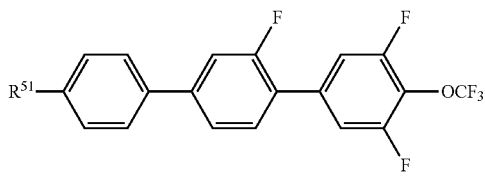

in which
R$^{51}$ has the meaning indicated above and preferably denotes C$_n$H$_{2n+1}$, in which
n denotes an integer in the range from 0 to 7, preferably in the range from 1 to 5 and particularly preferably 3 or 7.

The compounds of the formula V-1b are preferably compounds of the formula V-2b-1 [sic]:

V-1b-1

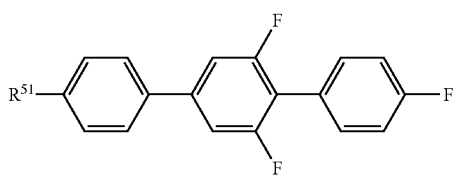

in which
R$^{51}$ has the meaning indicated above and preferably denotes C$_n$H$_{2n+1}$ in which
n denotes an integer in the range from 0 to 15, preferably in the range from 1 to 7 and particularly preferably 1 to 5.

The compounds of the formula V-1c are preferably selected from the group of the compounds of the formulae V-1c-1 to V-1c-4, preferably selected from the group of the compounds of the formulae V-1c-1 and V-1c-2, more preferably these compounds of the formula V predominantly consist, even more preferably essentially consist and very particularly preferably completely consist thereof:

V-1c-1

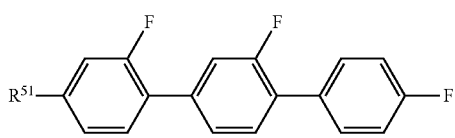

V-1c-2

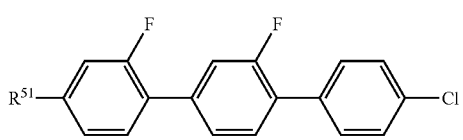

V-1c-3

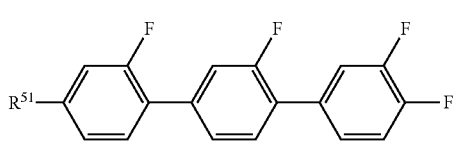

V-1c-4

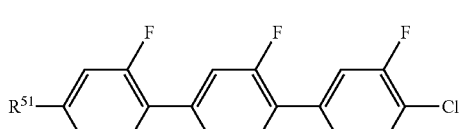

in which
R$^{51}$ has the meaning indicated above and preferably denotes C$_n$H$_{2n+1}$ in which n denotes an integer in the range from 0 to 15, preferably in the range from 1 to 7 and particularly preferably 1 to 5.

The compounds of the formula V-1d are preferably selected from the group of the compounds of the formulae V-1d-1 and V-1d-2, preferably the compound of the formula V-1d-2, more preferably these compounds of the formula V predominantly consist, even more preferably essentially consist and very particularly preferably completely consist thereof:

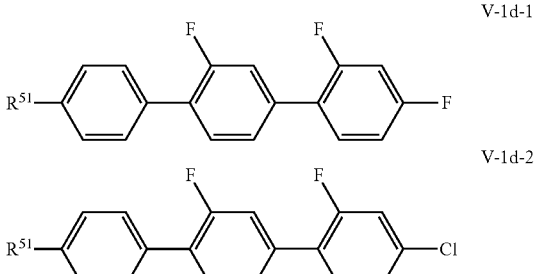

V-1d-1

V-1d-2 in which
R$^{51}$ has the meaning indicated above and preferably denotes C$_n$H$_{2n+1}$, in which
n denotes an integer in the range from 0 to 15, preferably in the range from 1 to 7 and particularly preferably 1 to 5.

The compounds of the formula V-2a are preferably selected from the group of the compounds of the formulae V-2a-1 and V-2a-2, preferably the compound of the formula V-2a-1, more preferably these compounds of the formula V predominantly consist, even more preferably essentially consist and very particularly preferably completely consist thereof:

V-2a-1

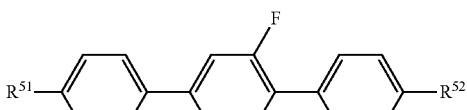

V-2a-2

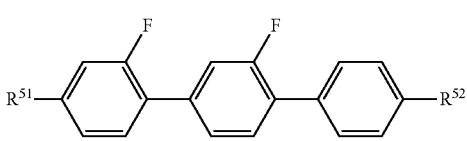

in which
R$^{51}$ has the meaning indicated above and preferably denotes C$_n$H$_{2n+1}$ or CH$_2$=CH—(CH$_2$)$_z$, and
R$^{52}$ has the meaning indicated above and preferably denotes C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

Preferred combinations of (R$^{51}$ and R$^{52}$), in particular in the case of formula V-2a-1, are (C$_n$H$_{2n+1}$ and C$_m$H$_{2m+1}$), (C$_n$H$_{2n+1}$ and O—C$_m$H$_{2m+1}$), (CH$_2$=CH—(CH$_2$)$_z$ and C$_m$H$_{2m+1}$), (CH$_2$=CH—(CH$_2$)$_z$ and O—C$_m$H$_{2m+1}$) and (C$_n$H$_{2n+1}$ and (CH$_2$)$_z$—CH=CH$_2$).

Preferred compounds of the formula V-2b are the compounds of the formula V-2b-1:

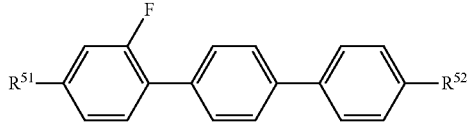

V-2b-1 in which
R$^{51}$ has the meaning indicated above and preferably denotes
  C$_n$H$_{2n+1}$ or CH$_2$=CH—(CH$_2$)$_z$, and
R$^{52}$ has the meaning indicated above and preferably denotes
  C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2c are the compounds of the formula V-2c-1:

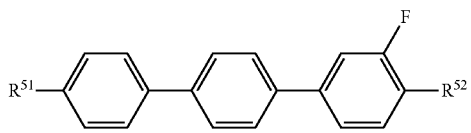

V-2c-1 in which
R$^{51}$ has the meaning indicated above and preferably denotes
  C$_n$H$_{2n+1}$ or CH$_2$=CH—(CH$_2$)$_z$, and
R$^{52}$ has the meaning indicated above and preferably denotes
  C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2d are the compounds of the formula V-2d-1:

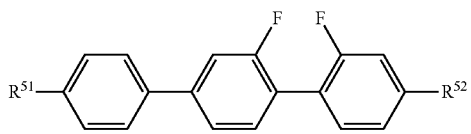

V-2d-1 in which
R$^{51}$ has the meaning indicated above and preferably denotes
  C$_n$H$_{2n+1}$ or CH$_2$=CH—(CH$_2$)$_z$, and
R$^{52}$ has the meaning indicated above and preferably denotes
  C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and C$_m$H$_{2m+1}$).

Preferred compounds of the formula V-2e are the compounds of the formula V-2e-1:

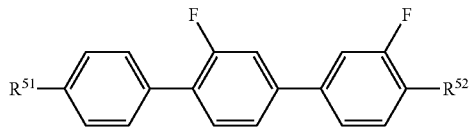

V-2e-1 in which
R$^{51}$ has the meaning indicated above and preferably denotes
  C$_n$H$_{2n+1}$ or CH$_2$=CH—(CH$_2$)$_z$, and
R$^{52}$ has the meaning indicated above and preferably denotes
  C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combination of (R$^{51}$ and R$^{52}$) here is, in particular, (C$_n$H$_{2n+1}$ and O—C$_m$H$_{2m+1}$).

Preferred compounds of the formula V-2f are the compounds of the formula V-2f-1:

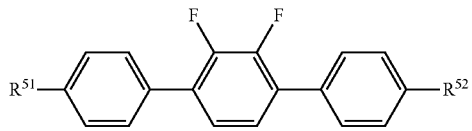

V-2f-1 in which
R$^{51}$ has the meaning indicated above and preferably denotes
  C$_n$H$_{2n+1}$ or CH$_2$=CH—(CH$_2$)$_z$, and
R$^{52}$ has the meaning indicated above and preferably denotes
  C$_m$H$_{2m+1}$ or O—C$_m$H$_{2m+1}$ or (CH$_2$)$_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{51}$ and R$^{52}$) here are, in particular, (C$_n$H$_{2n+1}$ and C$_m$H$_{2m+1}$) and (C$_n$H$_{2n+1}$ and O—C$_m$H$_{2m+1}$), particularly preferably (C$_n$H$_{2n+1}$ and C$_m$H$_{2m+1}$).

Preferred compounds of the formula V-2g are the compounds of the formula V-2f-1 [sic]:

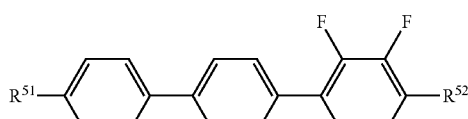

V-2f-1 in which
R$^{51}$ has the meaning indicated above and preferably denotes
  C$_n$H$_{2n+1}$ or CH$_2$=CH—(CH$_2$)$_z$, and $R^{52}$ has the meaning indicated above and preferably denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{51}$ and $R^{52}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $O-C_mH_{2m+1}$).

The compounds of the formula VI are preferably selected from the group of the compounds of the formulae VI-1 to VI-4, more preferably these compounds of the formula VI predominantly consist, even more preferably essentially consist and very particularly preferably completely consist thereof:

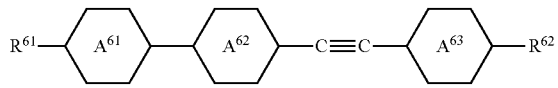

VI-1

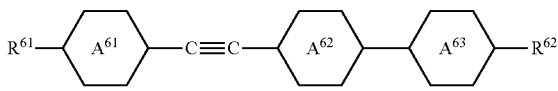

VI-2

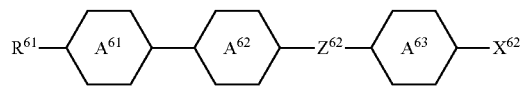

VI-3

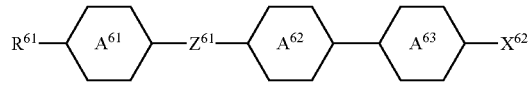

VI-4 in which $Z^{61}$ and $Z^{62}$ denote trans-CH=CH— or trans-CF=CF—, preferably trans-CH=CH—, and the other parameters have the meaning given above under formula VI and preferably $R^{61}$ and $R^{62}$, independently of one another, denote H, unfluorinated alkyl or alkoxy having 1 to 7 C atoms or unfluorinated alkenyl having 2 to 7 C atoms, $X^{62}$ denotes F, Cl, —CN or —NCS, preferably —NCS, and one of

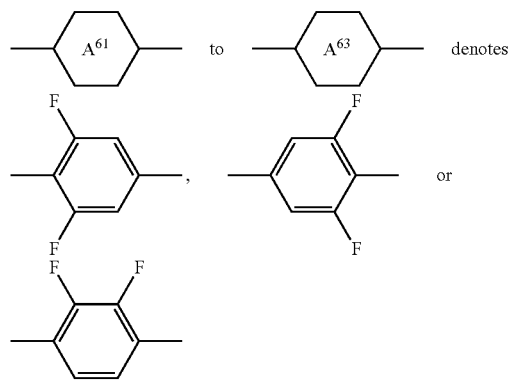

and the others, independently of one another, denote

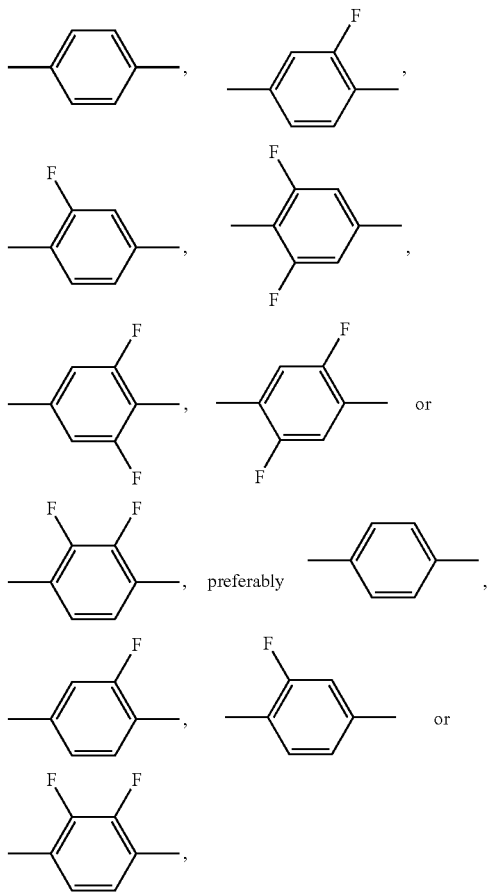

and preferably $R^{61}$ denotes $C_nH_{2n+1}$ or $CH_2=CH-(CH_2)_z$, and $R^{62}$ denotes $C_mH_{2m+1}$ or $O-C_mH_{2m+1}$ or $(CH_2)_z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The compounds of the formula VI-1 are preferably selected from the group of the compounds of the formulae VI-1a and VI-1b, preferably selected from compounds of the formula VI-1a, more preferably these compounds of the formula VI predominantly consist, even more preferably essentially consist and very particularly preferably completely consist thereof:

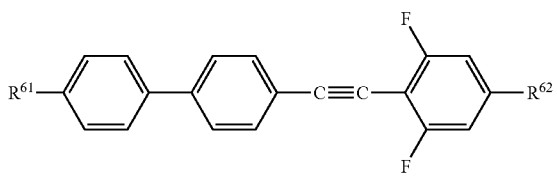

VI-1a

-continued

VI-1b

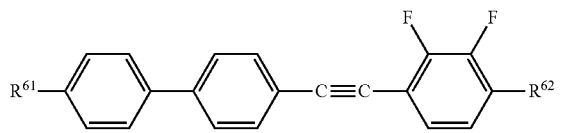

in which
R$^{61}$ has the meaning indicated above and preferably denotes C$_n$H$_{2n+1}$ or CH$_2$=CH—(CH$_2$)$_Z$, and
R$^{62}$ has the meaning indicated above and preferably denotes C$_m$H$_{2m+1}$ or O—C$_m$H$_{2m+1}$ or (CH$_2$)$_Z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of (R$^{61}$ and R$^{62}$) here are, in particular, (C$_n$H$_{2n+1}$ and C$_m$H$_{2m+1}$) and (C$_n$H$_{2n+1}$ and O—C$_m$H$_{2m+1}$), in the case of formula VI-1a particularly preferably (C$_n$H$_{2n+1}$ and C$_m$H$_{2m+1}$) and in the case of formula VI-1b particularly preferably (C$_n$H$_{2n+1}$ and O—C$_m$H$_{2m+1}$).

The compounds of the formula VI-3 are preferably compounds of the formula VI-3a:

VI-3a

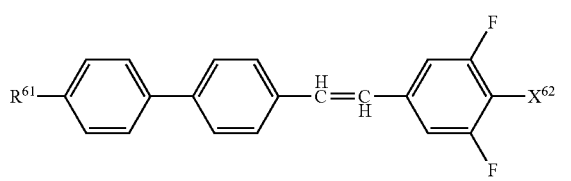

in which the parameters have the meaning given above under formula VI-3 and preferably
R$^{61}$ has the meaning indicated above and preferably denotes C$_n$H$_{2n+1}$, in which
n denotes an integer in the range from 0 to 7, preferably in the range from 1 to 5, and
X$^{62}$ denotes —F, —Cl, OCF$_3$, —CN or —NCS, particularly preferably —NCS.

The compounds of the formula VI-4 are preferably compounds of the formula VI-4-a:

VI-4a

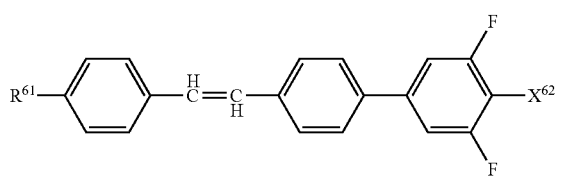

in which the parameters have the meaning given above under formula VI-4 and preferably
R$^{61}$ has the meaning indicated above and preferably denotes C$_n$H$_{2n+1}$, in which
n denotes an integer in the range from 0 to 7, preferably in the range from 1 to 5, and X$^{62}$ denotes F, Cl, OCF$_3$, —CN or —NCS, particularly preferably —NCS.

Further preferred compounds of the formula VI are the compounds of the following formulae:

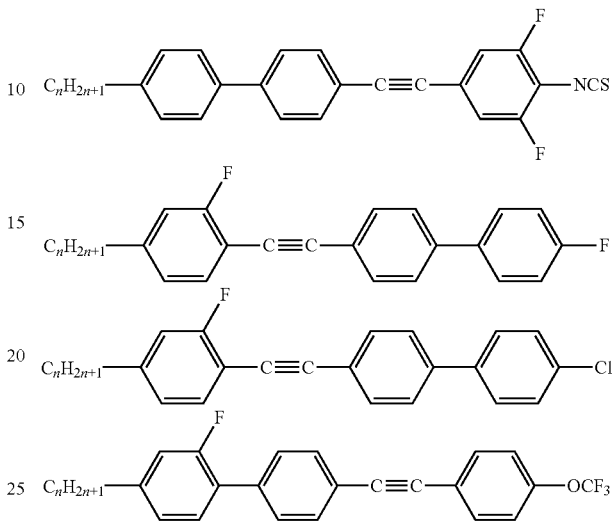

in which
n denotes an integer in the range from 0 to 7, preferably in the range from 1 to 5.

The compounds of the formula VII are preferably selected from the group of the compounds of the formulae VII-1 to VII-6, more preferably these compounds of the formula VII predominantly consist, even more preferably essentially consist and very particularly preferably completely consist thereof:

VII-1

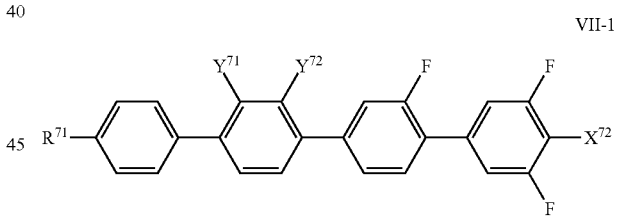

VII-2

VII-3

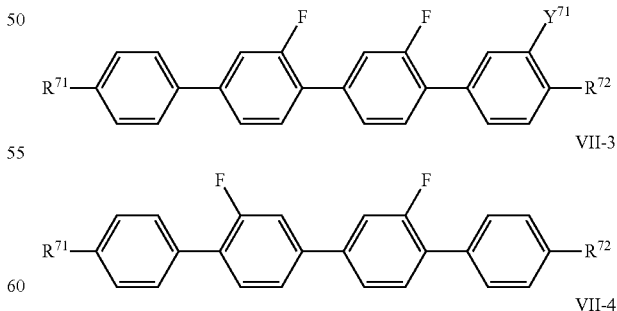

VII-4

VII-5

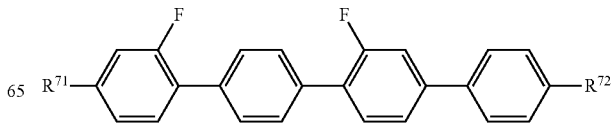

VII-5

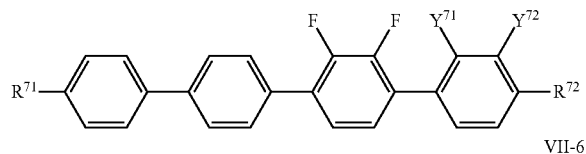

VII-6

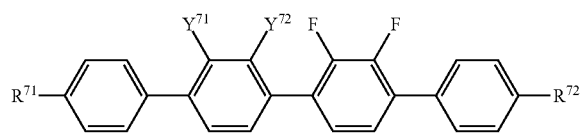

where the compounds of the formula VII-5 are excluded from the compounds of the formula VII-6, and
in which the parameters have the respective meanings indicated above for formula VII and preferably
$R^{71}$ denotes unfluorinated alkyl or alkoxy, each having 1 to 7 C atoms, or unfluorinated alkenyl having 2 to 7 C atoms,
$R^{72}$ denotes unfluorinated alkyl or alkoxy, each having 1 to 7 C atoms, or unfluorinated alkenyl having 2 to 7 C atoms, and
$X^{72}$ denotes F, Cl or —OCF$_3$, preferably F, and
particularly preferably
$R^{71}$ has the meaning indicated above and preferably denotes $C_nH_{2n+1}$ or $CH_2$=CH—$(CH_2)_z$, and
$R^{72}$ has the meaning indicated above and preferably denotes $C_mH_{2m+1}$ or O—$C_mH_{2m+1}$ or $(CH_2)_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The compounds of the formula VII-1 are preferably selected from the group of the compounds of the formulae VII-1a to VII-1d, more preferably these compounds of the formula VII-1 predominantly consist, even more preferably essentially consist and very particularly preferably completely consist thereof:

VII-1a

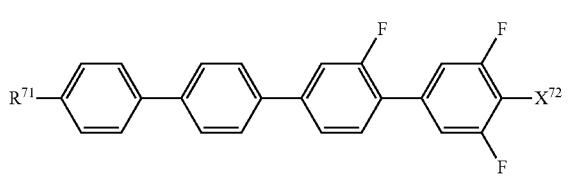

VII-1b

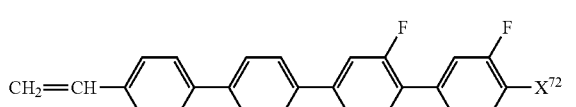

VII-1c

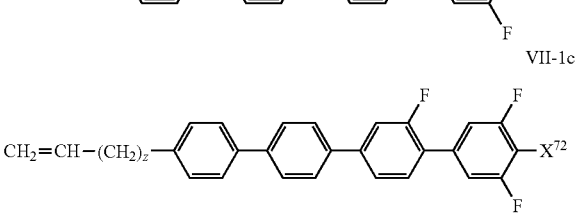

VII-1d

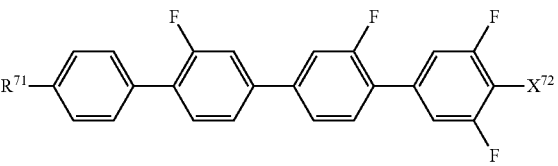

in which $X^{72}$ has the meaning given above for formula VII-2 and
$R^{71}$ has the meaning indicated above and preferably denotes $C_nH_{2n+1}$ in which
n denotes 1 to 7, preferably 2 to 6, particularly preferably 2, 3 or 5, and
z denotes 0, 1, 2, 3 or 4, preferably 0 or 2, and
$X^{72}$ preferably denotes F.

The compounds of the formula VII-2 are preferably selected from the group of the compounds of the formulae VII-2a and VII-2b, preferably of the formula VII-2a, more preferably these compounds of the formula VII-2 predominantly consist, even more preferably essentially consist and very particularly preferably completely consist thereof:

VII-2a

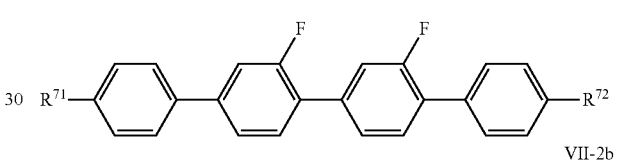

VII-2b

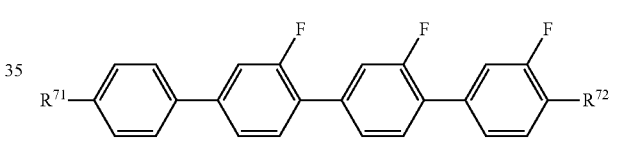

in which
$R^{71}$ has the meaning indicated above and preferably denotes $C_nH_{2n+1}$ or $CH_2$=CH—$(CH_2)_z$, and
$R^{72}$ has the meaning indicated above and preferably denotes $C_mH_{2m+1}$ or O—$C_mH_{2m+1}$ or $(CH_2)_z$—CH=CH$_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and $C_mH_{2m+1}$).

The compounds of the formula VII-3 are preferably compounds of the formula VII-3a:

VII-3a

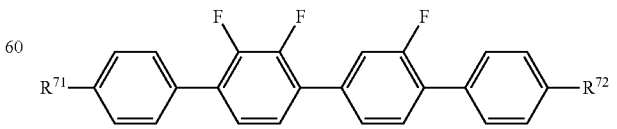

in which
$R^{71}$ has the meaning indicated above and preferably denotes $C_nH_{2n+1}$ or $CH_2$=CH—$(CH_2)_z$, and $R^{72}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VII-4 are preferably compounds of the formula VII-4-a:

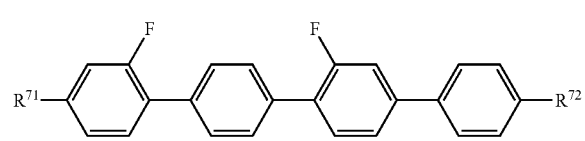

VII-4a in which $R^{71}$ has the meaning indicated above and preferably denotes $C_nH_{2n+1}$ or $CH_2=CH-(CH_2)_z$, and $R^{72}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VII-5 are preferably selected from the group of the compounds of the formulae VII-5a and VII-5b, preferably of the formula VII-5a, more preferably these compounds of the formula VII-5 predominantly consist, even more preferably essentially consist and very particularly preferably completely consist thereof:

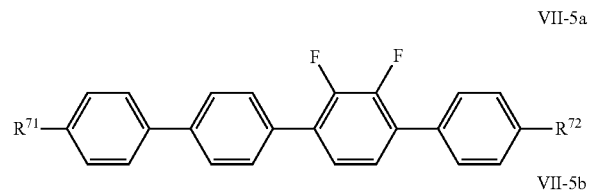

VII-5a

VII-5b in which $R^{71}$ has the meaning indicated above and preferably denotes $C_nH_{2n+1}$ or $CH_2=CH-(CH_2)_z$, and $R^{72}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VII-6 are preferably selected from the group of the compounds of the formulae VII-6a and VII-6b, more preferably these compounds of the formula VII-6 predominantly consist, even more preferably essentially consist and very particularly preferably completely consist thereof:

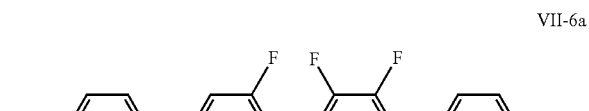

VII-6a

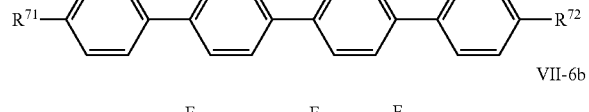

VII-6b in which $R^{71}$ has the meaning indicated above and preferably denotes $C_nH_{2n+1}$ or $CH_2=CH-(CH_2)_z$, and $R^{72}$ has the meaning indicated above and preferably denotes $C_mH_{2m+1}$ or $O-C_mH_{2m+1}$ or $(CH_2)_Z-CH=CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{71}$ and $R^{72}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The liquid-crystalline media in accordance with the present application preferably comprise in total 0 to 40%, preferably 0 to 30% and particularly preferably 5 to 25%, of compounds of the formula VIII.

The compounds of the formula VIII are preferably selected from the group of the compounds of the formulae VIII-1 to VIII-3, more preferably these compounds of the formula VIII predominantly consist, even more preferably essentially consist and very particularly preferably completely consist thereof:

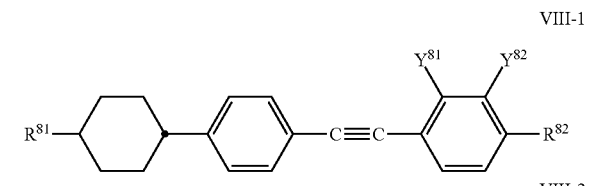

VIII-1

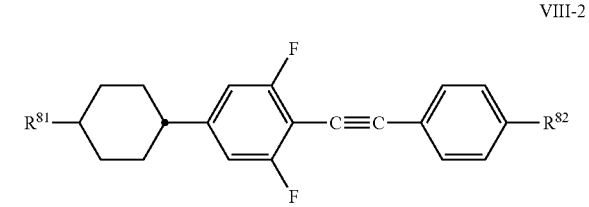

VIII-2

VIII-3

[Chemical structure VIII-3: R⁸¹—cyclohexyl—phenyl—C≡C—difluorophenyl—R⁸²]

in which
one of
$Y^{81}$ and $Y^{82}$ denotes H and the other denotes H or F, and
$R^{81}$ has the meaning indicated above and preferably denotes
$C_nH_{2n+1}$ or $CH_2=CH-(CH_2)_z$, and
$R^{82}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VIII-1 are preferably selected from the group of the compounds of the formulae VIII-1a to VIII-1c, more preferably these compounds of the formula VIII-1 predominantly consist, even more preferably essentially consist and very particularly preferably completely consist thereof:

VIII-1a

[Chemical structure VIII-1a: R⁸¹—cyclohexyl—phenyl—C≡C—phenyl—R⁸²]

VIII-1b

[Chemical structure VIII-1b: R⁸¹—cyclohexyl—phenyl—C≡C—difluorophenyl—R⁸²]

VIII-1c

[Chemical structure VIII-1c: R⁸¹—cyclohexyl—phenyl—C≡C—fluorophenyl—R⁸²]

in which
$R^{81}$ has the meaning indicated above and preferably denotes
$C_nH_{2n+1}$ or $CH_2=CH-(CH_2)_z$, and
$R^{82}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and $O-C_mH_{2m+1}$), particularly preferably ($C_nH_{2n+1}$ and $C_mH_{2m+1}$).

The compounds of the formula VIII-2 are preferably compounds of the formula VIII-2a:

VIII-2a

[Chemical structure VIII-2a: R⁸¹—cyclohexyl—difluorophenyl—C≡C—phenyl—R⁸²]

in which
$R^{81}$ has the meaning indicated above and preferably denotes
$C_nH_{2n+1}$ or $CH_2=CH-(CH_2)_z$, and
$R^{82}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$), ($C_nH_{2n+1}$ and $O-C_mH_{2m+1}$) and ($CH_2=CH-(CH_2)_z$ and $C_mH_{2m+1}$), particularly preferably ($C_nH_{2n+1}$ and $C_mH_{2m+1}$).

The compounds of the formula VIII-3 are preferably compounds of the formula VIII-3a:

VIII-3a

[Chemical structure VIII-3a: R⁸¹—cyclohexyl—phenyl—C≡C—difluorophenyl—R⁸²]

in which
$R^{81}$ has the meaning indicated above and preferably denotes
$C_nH_{2n+1}$ or $CH_2=CH-(CH_2)_z$, and
$R^{82}$ has the meaning indicated above and preferably denotes $C_mH_{2m+1}$ or $O-C_mH_{2m+1}$ or $(CH_2)_z-CH=CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{81}$ and $R^{82}$) here are, in particular, ($C_nH_{2n+1}$ and $C_mH_{2m+1}$) and ($C_nH_{2n+1}$ and $O-C_mH_{2m+1}$).

The compounds of the formula IX are preferably selected from the group of the compounds of the formulae IX-1 to IX-3, more preferably these compounds of the formula IX predominantly consist, even more preferably essentially consist and very particularly preferably completely consist thereof:

IX-1

[Chemical structure IX-1: R⁹¹—A⁹¹—A⁹²—fluorophenyl—A⁹⁴—X⁹²]

IX-2

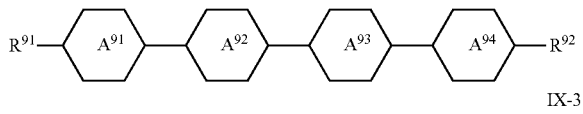

IX-3

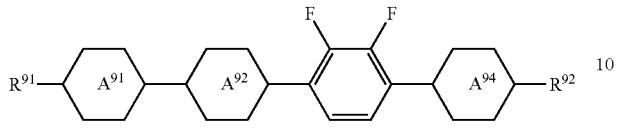

in which the parameters have the respective meaning indicated above under formula IX and preferably one of

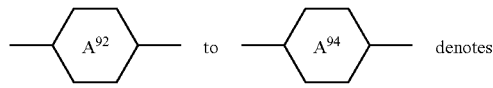 to 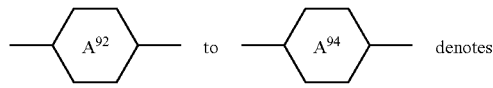 denotes

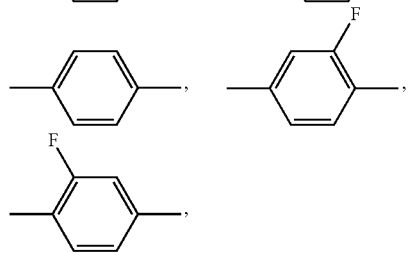

and
in which
$R^{91}$ has the meaning indicated above and preferably denotes
$C_nH_{2n+1}$ or $CH_2$=CH—$(CH_2)_z$, and
$R^{92}$ has the meaning indicated above and preferably denotes
$C_mH_{2m+1}$ or O—$C_mH_{2m+1}$ or $(CH_2)_z$—CH=$CH_2$, and in which
n and m, independently of one another, denote an integer in the range from 0 to 15, preferably in the range from 1 to 7 and particularly preferably 1 to 5, and
z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and O—$C_mH_{2m+1}$).

The liquid-crystalline media in accordance with the present application preferably comprise in total 5 to 30%, preferably 10 to 25% and particularly preferably 15 to 20%, of compounds of the formula IX.

The compounds of the formula IX-1 are preferably selected from the group of the compounds of the formulae IX-1a to IX-1e, more preferably these compounds of the formula IX-1 predominantly consist, even more preferably essentially consist and very particularly preferably completely consist thereof:

IX-1a

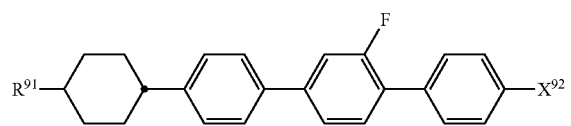

IX-1b

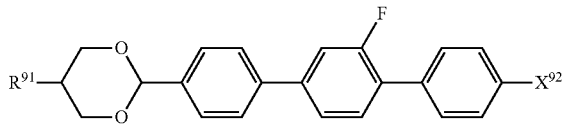

IX-1c

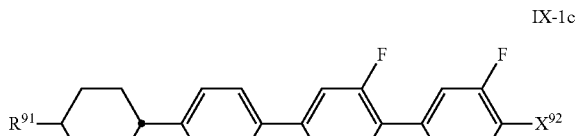

IX-1d

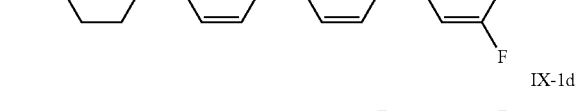

IX-1e

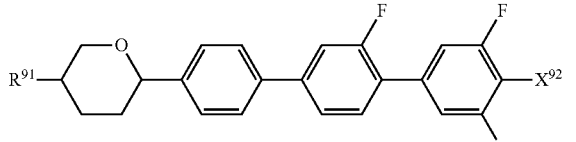

in which the parameters have the meaning given above and preferably
$R^{91}$ has the meaning indicated above and preferably denotes
$C_nH_{2n+1}$, and
n denotes an integer in the range from 0 to 15, preferably in the range from 1 to 7 and particularly preferably 1 to 5, and
$X^{92}$ preferably denotes F or Cl.

The compounds of the formula IX-2 are preferably selected from the group of the compounds of the formulae IX-2a and IX-2b, more preferably these compounds of the formula IX-2 predominantly consist, even more preferably essentially consist and very particularly preferably completely consist thereof:

IX-2a

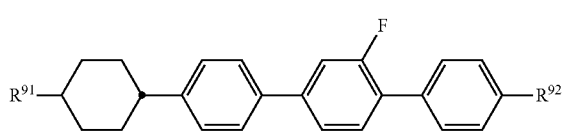

IX-2b

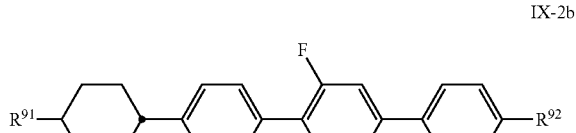

in which
$R^{91}$ has the meaning indicated above and preferably denotes
$C_nH_{2n+1}$ or $CH_2$=CH—$(CH_2)_z$, and
$R^{92}$ has the meaning indicated above and preferably denotes
$C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combination of ($R^{91}$ and $R^{92}$) here is, in particular, ($C_nH_{2n+1}$ and $C_mH_{2m+1}$).

The compounds of the formula IX-3 are preferably compounds of the formulae IX-3a and IX-3b:

IX-3a

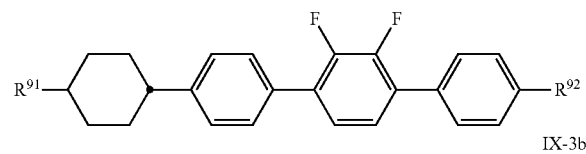

IX-3b

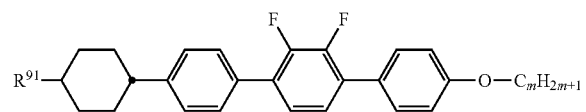

in which $R^{91}$ has the meaning indicated above and preferably denotes $C_nH_{2n+1}$ or $CH_2$=CH—$(CH_2)_z$, and $R^{92}$ has the meaning indicated above and preferably denotes $C_mH_{2m+1}$ or O—$C_mH_{2m+1}$ or $(CH_2)_z$—CH=$CH_2$, and in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{91}$ and $R^{92}$) here are, in particular, ($C_nH_{2n+1}$ and $C_mH_{2m+1}$) and ($C_nH_{2n+1}$ and O—$C_mH_{2m+1}$), particularly preferably ($C_nH_{2n+1}$ and O—$C_mH_{2m+1}$).

In a preferred embodiment of the present invention, the medium comprises one or more dielectrically positive compounds of the formula V-1 having a dielectric anisotropy of greater than 3.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

In a preferred embodiment of the present invention, the medium comprises one or more compounds of the formula VI.

In a further preferred embodiment of the present invention, the medium comprises one or more compounds of the formula VII.

The definitions of the abbreviations (acronyms) are indicated below in Table D or are evident from Tables A to C.

The liquid-crystalline media in accordance with the present invention preferably comprise, more preferably predominantly consist of, even more preferably essentially consist of and very particularly preferably completely consist of compounds selected from the group of the compounds of the formulae I, II, IV and V, preferably I, II and IV, or selected from the group of the compounds of the formulae I, III, IV and V, preferably I, III and IV.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more, of the component or components or compound or compounds indicated.

In this connection, essentially consist of means that the entity in question comprises 80% or more, preferably 90% or more and very preferably 95% or more, of the component or components or compound or compounds indicated.

In this connection, completely consist of means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

The liquid-crystal media in accordance with the present invention preferably have a clearing point of 90° C. or more, more preferably 100° C. or more, even more preferably 120° C. or more, particularly preferably 150° C. or more and very particularly preferably 170° C. or more.

The nematic phase of the media according to the invention preferably extends at least from 20° C. or less to 90° C. or more, preferably up to 100° C. or more, more preferably at least from 0° C. or less to 120° C. or more, very preferably at least from −10° C. or less to 140° C. or more and in particular at least from −20° C. or less to 150° C. or more.

The Δε of the liquid-crystal medium in accordance with the invention, at 1 kHz and 20° C., is preferably 1 or more, more preferably 2 or more and very preferably 3 or more.

The Δn of the liquid-crystal media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a preferred embodiment of the present application, the Δn of the liquid-crystal media in accordance with the present invention is preferably 0.50 or more, more preferably 0.55 or more.

In accordance with the present invention, the individual compounds of the formula I in the liquid-crystal media are preferably used in a total concentration of 10% to 100%, more preferably 30% to 95%, even more preferably 40% to 90% and very preferably 50% to 90%, of the mixture as a whole.

In the embodiment of the present invention in which the liquid-crystal media comprise one or more compounds selected from the group of the compounds of the formulae IIA and IIB, the further compounds are preferably employed as follows.

The compounds selected from the group of the compounds of the formulae IIA and IIB are preferably used in a total concentration of 1% to 30%, more preferably 2% to 20%, even more preferably 3% to 18% and very preferably 4% to 16%, of the mixture as a whole.

The compounds of the formula IV are preferably used in a total concentration of 1% to 20%, more preferably 2% to 15%, even more preferably 3% to 12% and very preferably 5% to 10%, of the mixture as a whole.

The liquid-crystal media preferably comprise, more preferably predominantly consist of and very preferably completely consist of in total 70% to 100%, more preferably 80% to 100% and very preferably 90% to 100% and in particular 95% to 100%, of the compounds of the formulae I, IIA, IIB and IV to IX, preferably of the formulae I, IIA, IIB and IV.

In the embodiment of the present invention in which the liquid-crystal media comprise one or more compounds selected from the group of the compounds of the formulae IIIA and IIIB, the further compounds are preferably employed as follows.

The compounds selected from the group of the compounds of the formulae IIIA and IIIB are preferably used in a total concentration of 1% to 60%, more preferably 5% to 55%, even more preferably 7% to 50% and very preferably 10% to 45%, of the mixture as a whole.

If the liquid-crystal media comprise only one or more compounds of the formula IIIA, but no compounds of the formula IIIB, the compounds of the formula IIIA are preferably used in a total concentration of 10% to 60%, more preferably 20% to 55%, even more preferably 30% to 50% and very preferably 35% to 45%, of the mixture as a whole.

If the liquid-crystal media comprise only one or more compounds of the formula IIIB, but no compounds of the formula IIIA, the compounds of the formula IIIB are preferably used in a total concentration of 5% to 45%, more preferably 10% to 40%, even more preferably 15% to 35% and very preferably 20% to 30%, of the mixture as a whole.

If the liquid-crystal media comprise both one or more compounds of the formula IIIA and one or more compounds of the formula IIIB, the compounds of the formula IIIA are preferably used in a total concentration of 5% to 50%, more preferably 10% to 45%, even more preferably 15% to 30% and very preferably 20% to 25%, of the mixture as a whole and the compounds of the formula IIIB are preferably used in a total concentration of 1% to 35%, more preferably 5% to 30%, even more preferably 7% to 25% and very preferably 10% to 20%, of the mixture as a whole.

The compounds of the formula IV are preferably used in a total concentration of 1% to 20%, more preferably 2% to 15%, even more preferably 3% to 12% and very preferably 5% to 10%, of the mixture as a whole.

The liquid-crystal media preferably comprise, more preferably predominantly consist of and very preferably completely consist of in total 70% to 100%, more preferably 80% to 100% and very preferably 90% to 100% and in particular 95% to 100%, of the compounds of the formulae I, IIIA, IIIB and IV to IX, preferably of the formulae I, IIIA and/or IIIB.

In a particularly preferred embodiment of the present invention, the liquid-crystalline media comprise one or more compounds of the formula V and one or more compounds of the formula VI.

In a further particularly preferred embodiment of the present invention, the liquid-crystalline media comprise one or more compounds of the formula V and one or more compounds of the formula VII.

The liquid-crystalline media in accordance with the present invention likewise preferably comprise one or more compounds of the formula V, one or more compounds of the formula VI and one or more compounds of the formula VIII.

If the liquid-crystalline media in accordance with the present application comprise one or more compounds of the formula V, the concentration of these compounds is preferably in total 10 to 30%, preferably 15 to 25% and particularly preferably 18 to 22%.

If the liquid-crystalline media in accordance with the present application comprise one or more compounds of the formula VI, the concentration of these compounds is preferably in total 15 to 35%, preferably 18 to 30% and particularly preferably 22 to 26%.

If the liquid-crystalline media in accordance with the present application comprise one or more compounds of the formula VII, the concentration of these compounds is preferably in total 4 to 25%, preferably 8 to 20% and particularly preferably 10 to 14%.

If the liquid-crystalline media in accordance with the present application comprise one or more compounds of the formula VIII, the concentration of these compounds is preferably in total 15 to 35%, preferably 18 to 30% and particularly preferably 22 to 26%.

If the liquid-crystalline media in accordance with the present application comprise one or more compounds of the formula IX, the concentration of these compounds is preferably in total 5 to 25%, preferably 10 to 20% and particularly preferably 13 to 17%.

In the present application, the expression dielectrically positive describes compounds or components where $\Delta\epsilon>3.0$, dielectrically neutral describes those where $-1.5\leq\Delta\epsilon\leq3.0$ and dielectrically negative describes those where $\Delta\epsilon<-1.5$. $\Delta\epsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

The following definitions apply here.

$$\Delta\epsilon\equiv(\epsilon_\parallel-\epsilon_\perp) \text{ and}$$

$$\epsilon_{average}=(\epsilon_\parallel+2\epsilon_\perp)/3.$$

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\epsilon_{\|}$) and polyimide AL-1054 from Japan Synthetic Rubber, Japan, for homogeneous orientation ($\epsilon_{\perp}$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 µm and an external radius of 350 µm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnet is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 160° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 µm for at least 100 hours. At high temperatures, the clearing point is measured in capillaries by conventional methods.

Furthermore, the liquid-crystal media according to the invention are characterised by high optical anisotropies in the visible range. The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

In a preferred embodiment of the present invention, the liquid-crystal media employed have a positive dielectric anisotropy (Δε). This is preferably between 1.8 or more and 15.0 or less, more preferably between 2.0 or more and 10.0 or less, particularly preferably between 3.0 or more and 8.0 or less and very particularly preferably between 3.5 or more and 6.0 or less.

If the liquid-crystal media employed have a negative dielectric anisotropy (Δε), this is preferably less than or equal to −2.5, particularly preferably less than or equal to −4.0 and very particularly preferably less than or equal to −5.0.

In this preferred embodiment of the present invention in which the liquid-crystal media employed have a negative dielectric anisotropy (Δε), its value is preferably between 1.5 or more and 15.0 or less, particularly preferably between 1.8 or more and 12.0 or less and very particularly preferably between 2.0 or more and 10.0 or less.

Furthermore, the liquid-crystal media according to the invention are characterised by high anisotropies in the microwave range. The birefringence is, for example, preferably 0.14 or more, particularly preferably 0.15 or more, particularly preferably 0.20 or more, particularly preferably 0.25 or more and very particularly preferably 0.30 or more, at about 8.3 GHz. In addition, the birefringence is preferably 0.80 or less.

The dielectric anisotropy in the microwave range is defined as $$\Delta\epsilon_r \equiv (\epsilon_{r,\|} - \epsilon_{r,\perp}).$$

The tunability (τ) is defined as $$\tau \equiv (\Delta\epsilon_r / \epsilon_{r,\|}).$$

The material quality (η) is defined as $\eta = (\tau / \tan \delta_{\epsilon r, max.})$, where the maximum dielectric loss is $\tan \delta_{\epsilon r, max.} = \max.\{\tan \delta_{\epsilon r, \perp}; \tan \delta_{\epsilon r, \parallel}\}$.

The material quality (η) of the preferred liquid-crystal materials is 6 or more, preferably 8 or more, preferably 10 or more, preferably 15 or more, preferably 17 or more, preferably 20 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups, as well as cycloalkyl groups, each having 1 to 15 carbon atoms, in particular the straight-chain groups methyl, ethyl, propyl, butyl, pentyl, hexyl and heptyl, as well as cyclopropyl and cyclohexyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote an integer from 1 to 10. Preferably, n is 1 and m is 1 to 6.

Compounds containing a vinyl end group and compounds containing a methyl end group have low rotational viscosity.

In the present application, both high-frequency technology and hyperfrequency technology denote applications having frequencies in the range from 1 MHz to 1 THz, preferably from 1 GHz to 500 GHz, more preferably 2 GHz to 300 GHz, particularly preferably from about 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 15 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$ $C_mH_{2m+1}$ and $C_lH_{2l+1}$ or $C_nH_{2n-1}$, $C_mH_{2m-1}$, and $C_lH_{2l-1}$ denote straight-chain alkyl or alkenyl, preferably 1E-alkenyl, having n, m and l C atoms respectively, where n, m and l, independently of one another, denote an integer from 1 to 9, preferably 1 to 7, or from 2 to 9, preferably 2 to 7, respectively. $C_oH_{2o+1}$ denotes straight-chain alkyl having 1 to 7, preferably 1 to 4, C atoms, or branched alkyl having 1 to 7, preferably 1 to 4, C atoms.

Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

C

P

D

DI

A

TABLE A-continued

| | Ring elements |
|---|---|
| AI | tetrahydropyran-2,5-diyl |
| G | 2-fluoro-1,4-phenylene |
| GI | 3-fluoro-1,4-phenylene (reversed) |
| U | 2,3-difluoro-1,4-phenylene |
| UI | 2,5-difluoro-1,4-phenylene |
| Y | 2,3-difluoro-1,4-phenylene variant |
| fX | fluorinated dibenzopyran |
| fXI | fluorinated dibenzopyran (reversed) |
| M | pyrimidine-2,5-diyl |
| MI | pyrimidine-5,2-diyl |
| N | pyridine-2,5-diyl |
| NI | pyridine-5,2-diyl |
| fN | 3-fluoropyridine-2,5-diyl |
| fNI | 3-fluoropyridine-5,2-diyl |
| dH | decahydronaphthalene-2,6-diyl |
| Np | naphthalene-2,6-diyl |
| N3f | trifluoronaphthalene-2,6-diyl |
| N3fI | trifluoronaphthalene-2,6-diyl (reversed) |
| tH | 1,2,3,4-tetrahydronaphthalene-2,6-diyl |
| tHI | 1,2,3,4-tetrahydronaphthalene-6,2-diyl |
| tH2f | difluorotetrahydronaphthalene-2,6-diyl |

TABLE A-continued
Ring elements
| | |
|---|---|
| tH2fI | 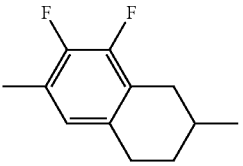 |
| K | 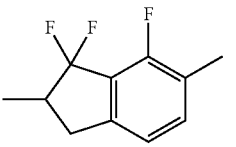 |
| KI | 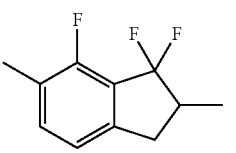 |
| L | 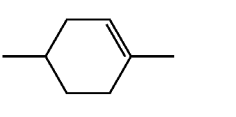 |
| LI | 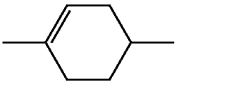 |
| F |  |
| FI | 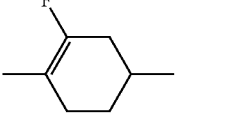 |
| P(o) | 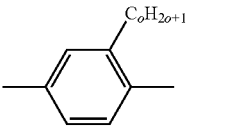 $C_oH_{2o+1}$ |
| PI(o) | $C_oH_{2o+1}$ 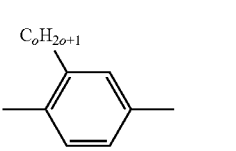 |
TABLE A-continued
Ring elements
| | |
|---|---|
| P(i3) | 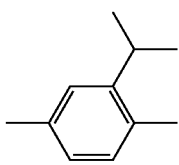 |
| PI(c3) | 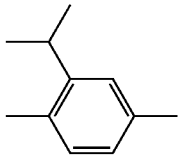 |
| P(t4) | 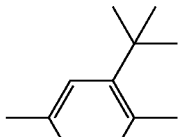 |
| PI(t4) | 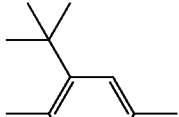 |
| P(c3) |  |
| PI(c3) | 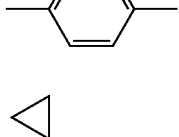 |
| P(c4) | 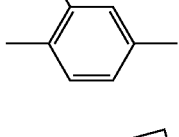 |
| PI(c4) | 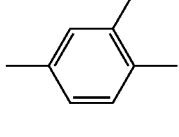 |

TABLE A-continued

Ring elements

| | |
|---|---|
| P(c5) | (cyclopentyl-phenyl structure) |
| PI(c5) | (cyclopentyl-phenyl structure, inverted) |
| P(c5e) | (cyclopentenyl-phenyl structure) |
| PI(c5e) | (cyclopentenyl-phenyl structure, inverted) |
| P(c6) | (cyclohexyl-phenyl structure) |
| PI(c6) | (cyclohexyl-phenyl structure, inverted) |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures
The illustrative structures show compounds which are particularly preferably employed.

Examples of compounds of component A

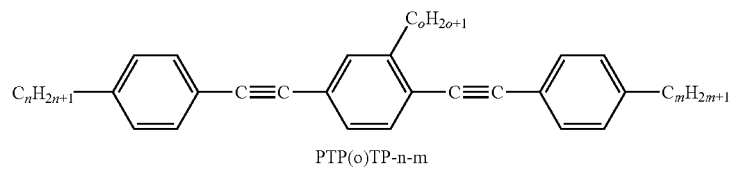

PTP(o)TP-n-m

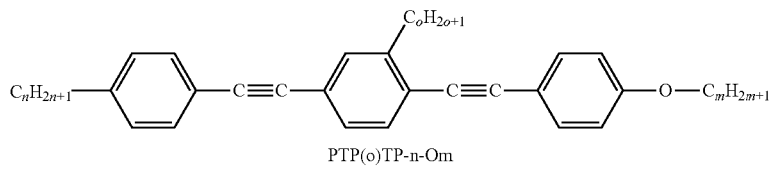

PTP(o)TP-n-Om

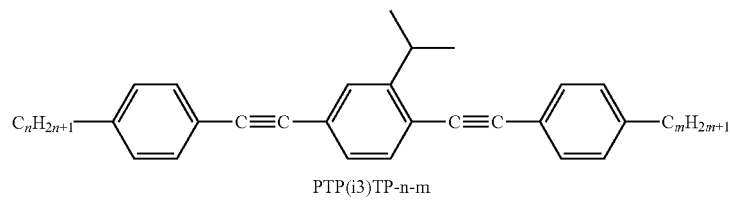

PTP(i3)TP-n-m

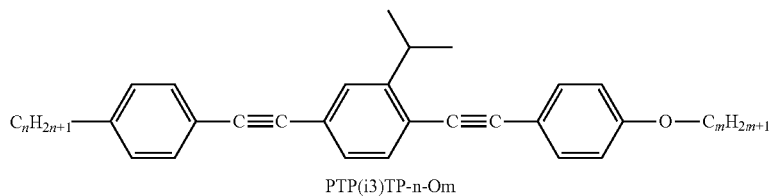

PTP(i3)TP-n-Om

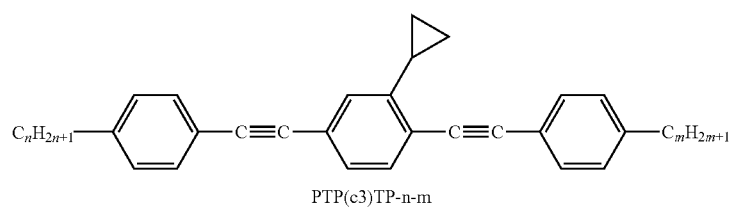

PTP(c3)TP-n-m

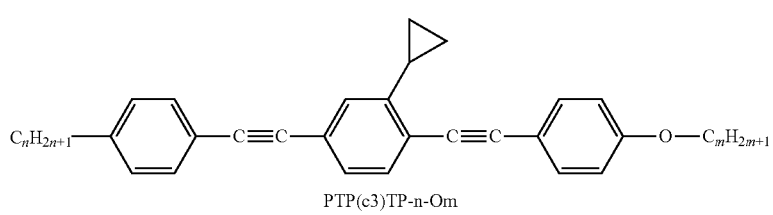

PTP(c3)TP-n-Om

TABLE D-continued
Illustrative structures
The illustrative structures show compounds which are particularly preferably employed.
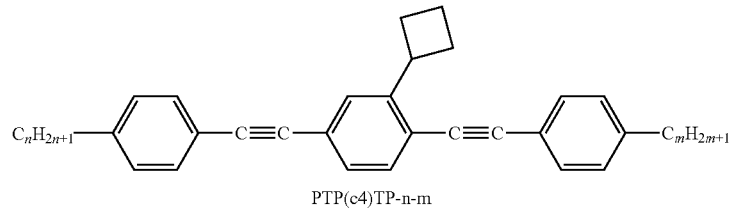
PTP(c4)TP-n-m
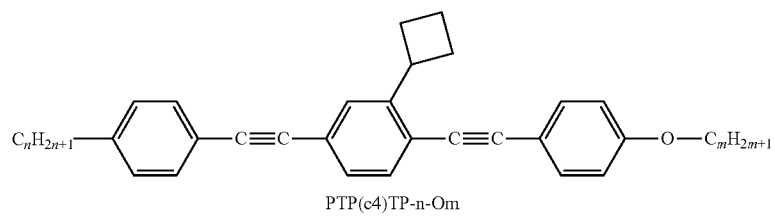
PTP(c4)TP-n-Om
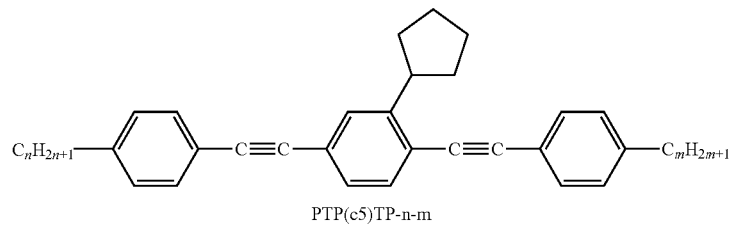
PTP(c5)TP-n-m
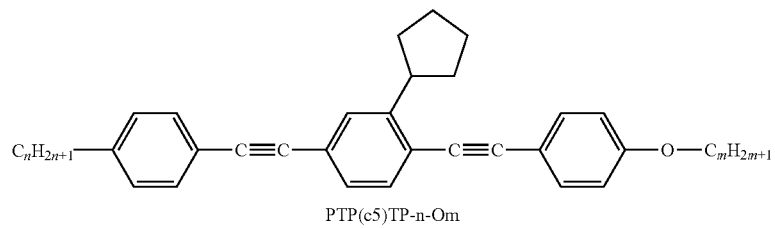
PTP(c5)TP-n-Om
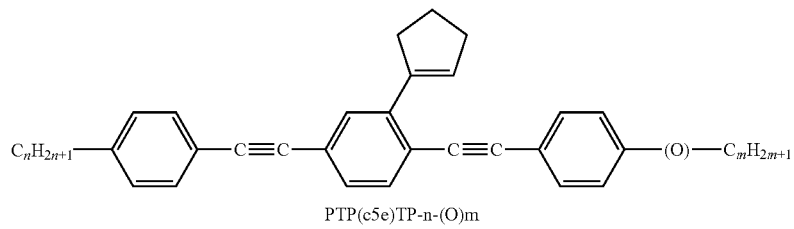
PTP(c5e)TP-n-(O)m
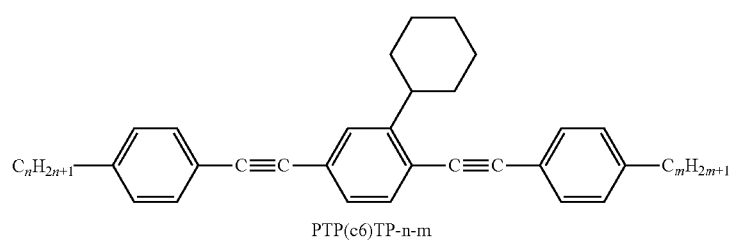
PTP(c6)TP-n-m TABLE D-continued
Illustrative structures
The illustrative structures show compounds which are particularly preferably employed.
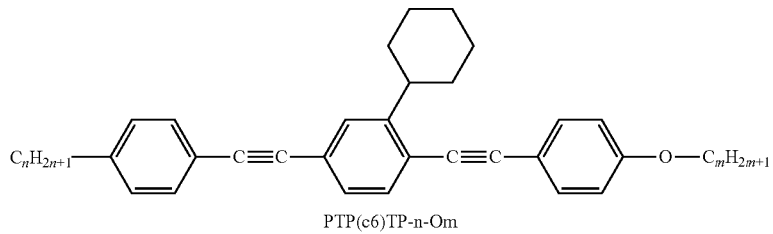
PTP(c6)TP-n-Om
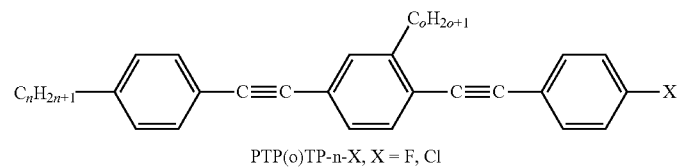
PTP(o)TP-n-X, X = F, Cl
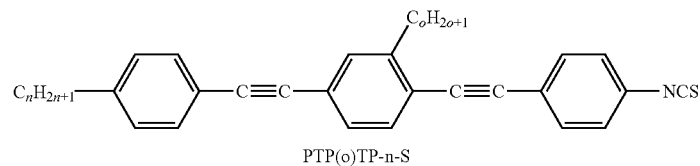
PTP(o)TP-n-S
Examples of compounds of component B
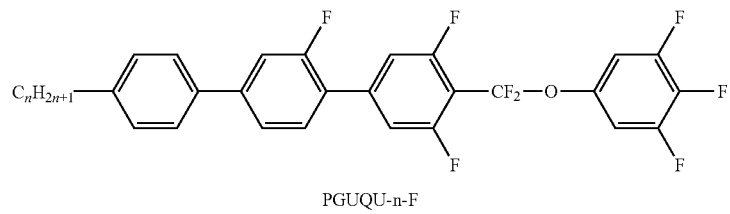
PGUQU-n-F
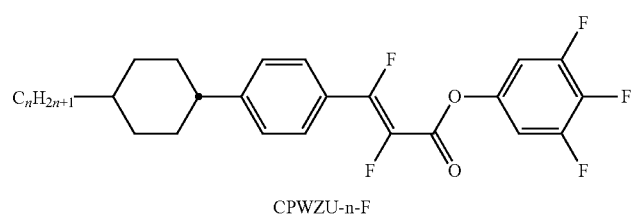
CPWZU-n-F
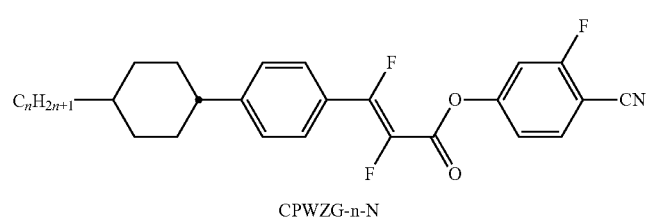
CPWZG-n-N
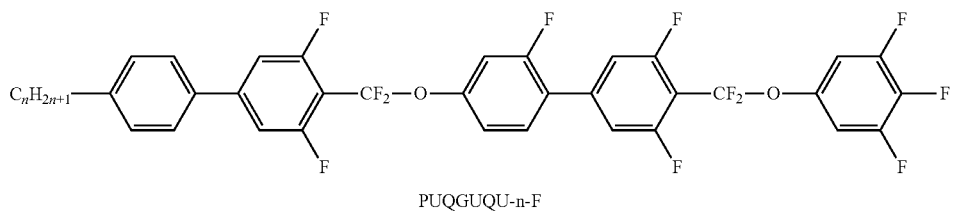
PUQGUQU-n-F TABLE D-continued
Illustrative structures
The illustrative structures show compounds which are particularly preferably employed.
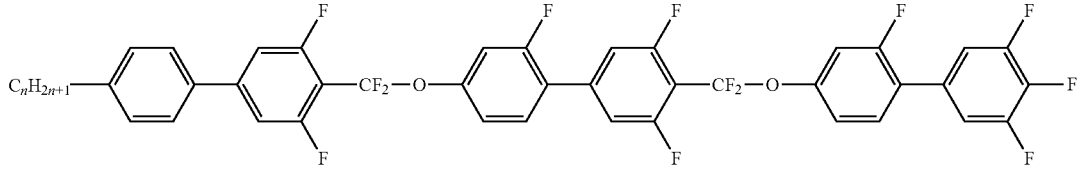
PUQGUQGU-n-F = PU[QGU]$_2$-n-F
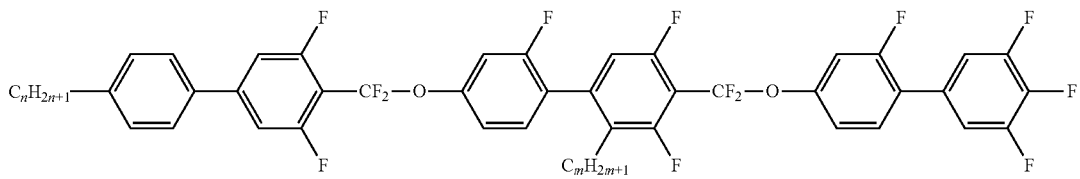
PUQGU(m)QGU-n-F = PU[QGU]$_2^{(m)}$-n-F
Examples of compounds of component C
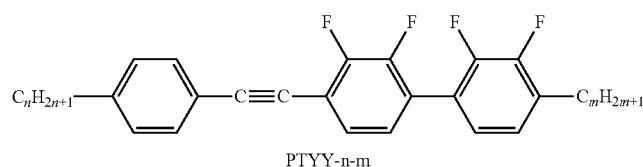
PTYY-n-m
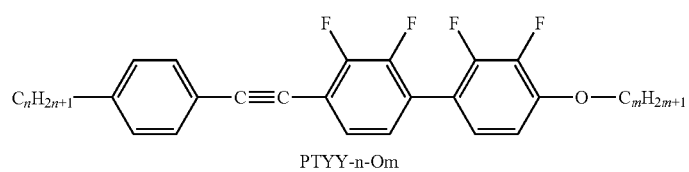
PTYY-n-Om
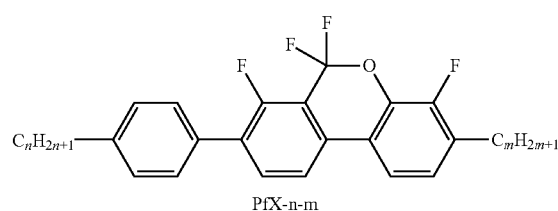
PfX-n-m
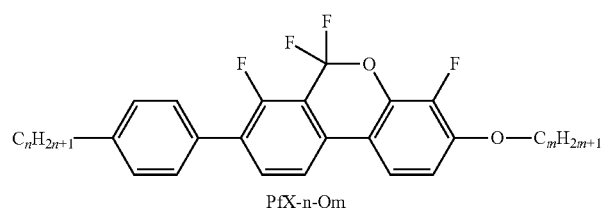
PfX-n-Om
Examples of compounds of component E
Compounds having three 6-membered rings
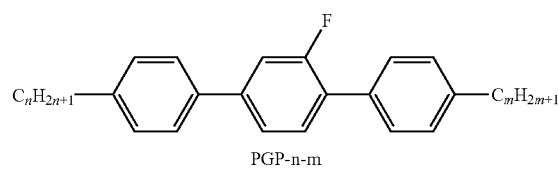
PGP-n-m TABLE D-continued
Illustrative structures
The illustrative structures show compounds which are particularly preferably employed.
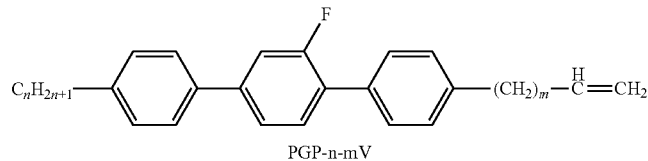
PGP-n-mV
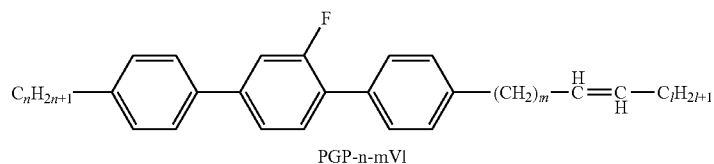
PGP-n-mVl
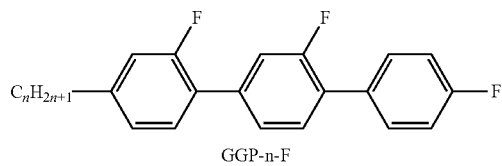
GGP-n-F
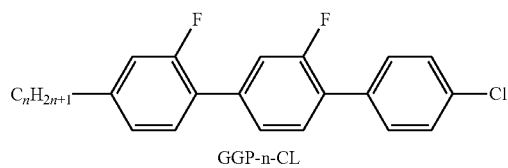
GGP-n-CL
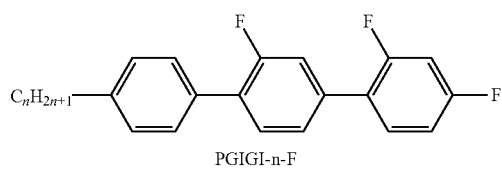
PGIGI-n-F
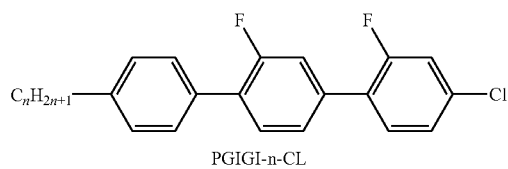
PGIGI-n-CL
Compounds having four 6-membered rings
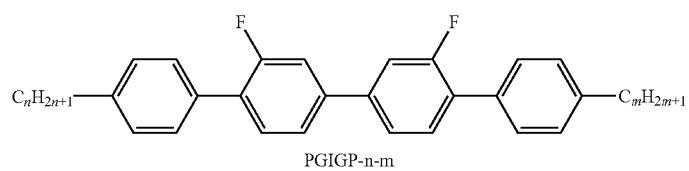
PGIGP-n-m
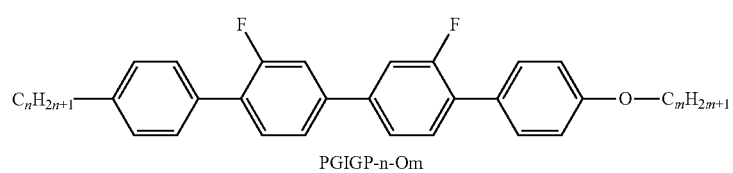
PGIGP-n-Om TABLE D-continued
Illustrative structures
The illustrative structures show compounds which are particularly preferably employed.
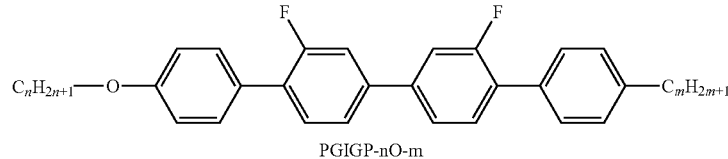
PGIGP-nO-m
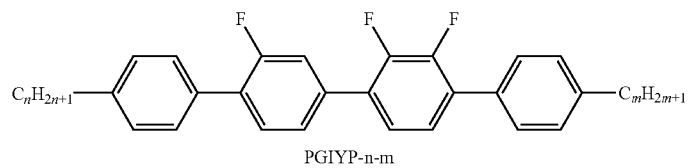
PGIYP-n-m
Illustrative structures of polar compounds employed:
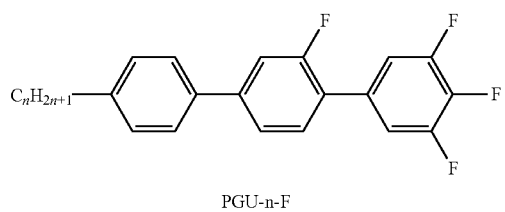
PGU-n-F
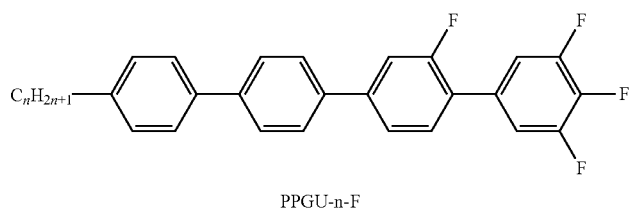
PPGU-n-F
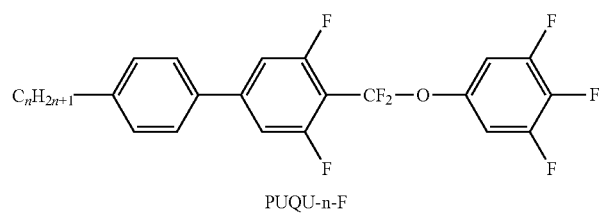
PUQU-n-F
Illustrative structures of further neutral compounds preferably employed:
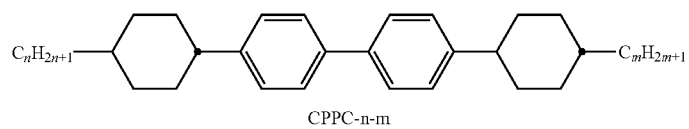
CPPC-n-m
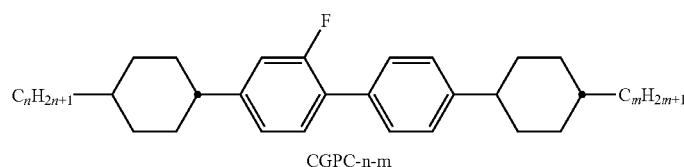
CGPC-n-m
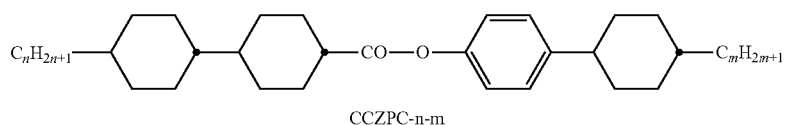
CCZPC-n-m TABLE D-continued
Illustrative structures
The illustrative structures show compounds which are particularly preferably employed.
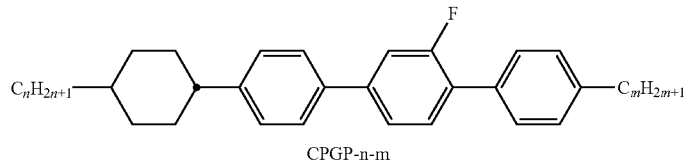
CPGP-n-m
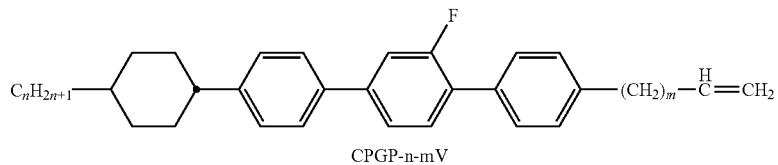
CPGP-n-mV
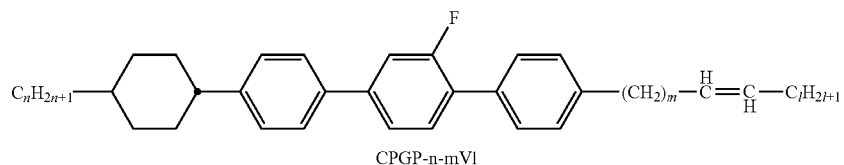
CPGP-n-mVl
Illustrative structures of further polar compounds employed:
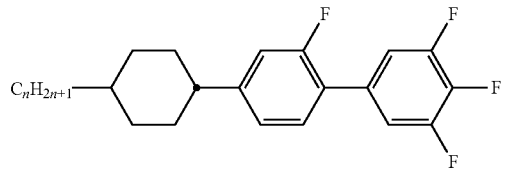
CGU-n-F
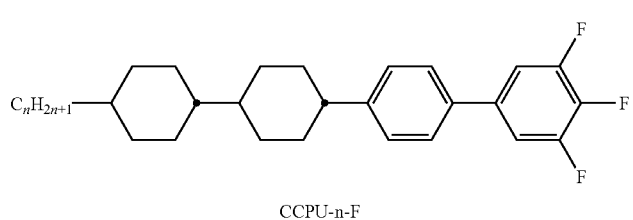
CCPU-n-F
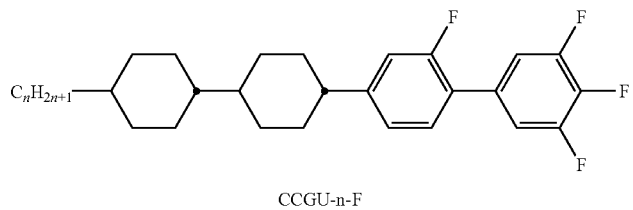
CCGU-n-F
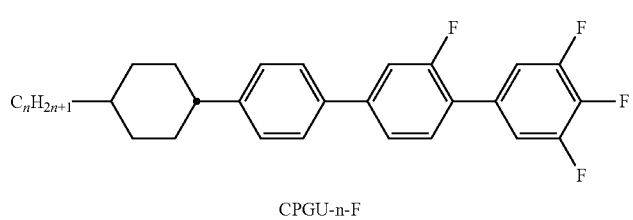
CPGU-n-F TABLE D-continued Illustrative structures
The illustrative structures show compounds which are particularly preferably employed.

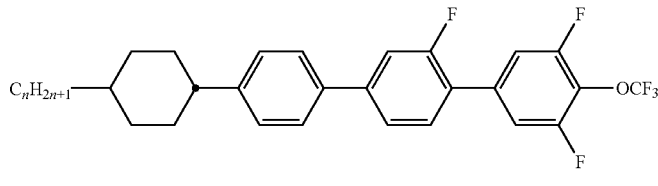

CPGU-n-OT

The following table, Table E, shows illustrative compounds which can be used as stabiliser in the mesogenic media in accordance with the present invention. The total concentration of these and similar compounds in the media is preferably 5% or less.

TABLE E

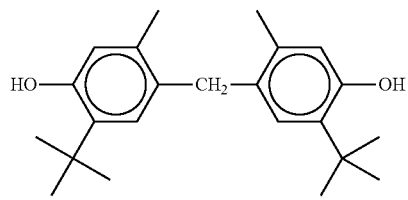

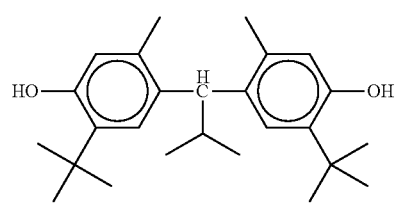

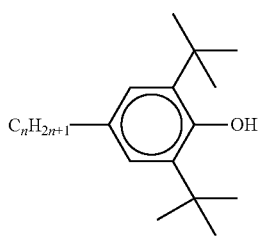

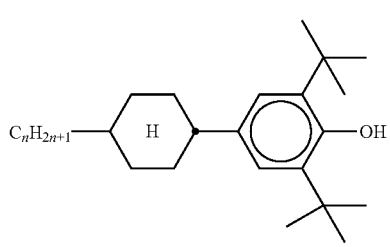

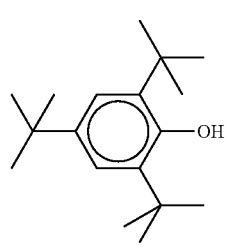

TABLE E-continued

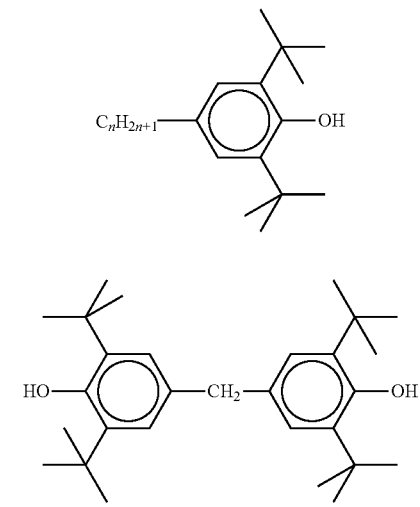

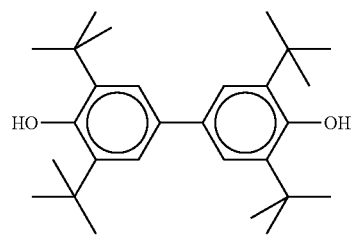

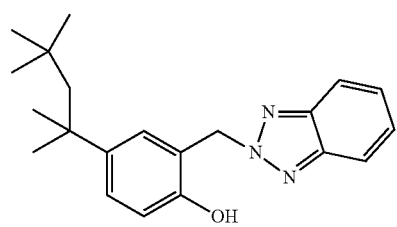 [SMILES: CC(C)(C)CC(C)(C)c1ccc(O)c(Cn2nc3ccccc3n2)c1]

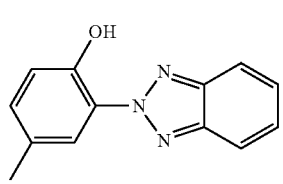 [SMILES: Cc1ccc(O)c(-n2nc3ccccc3n2)c1]

TABLE E-continued
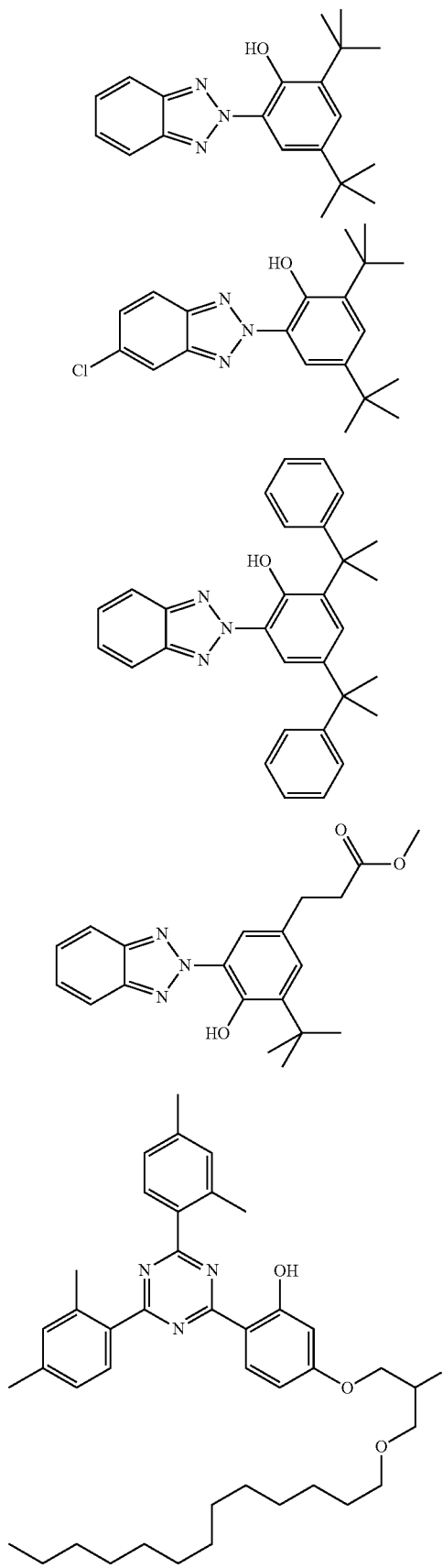
TABLE E-continued
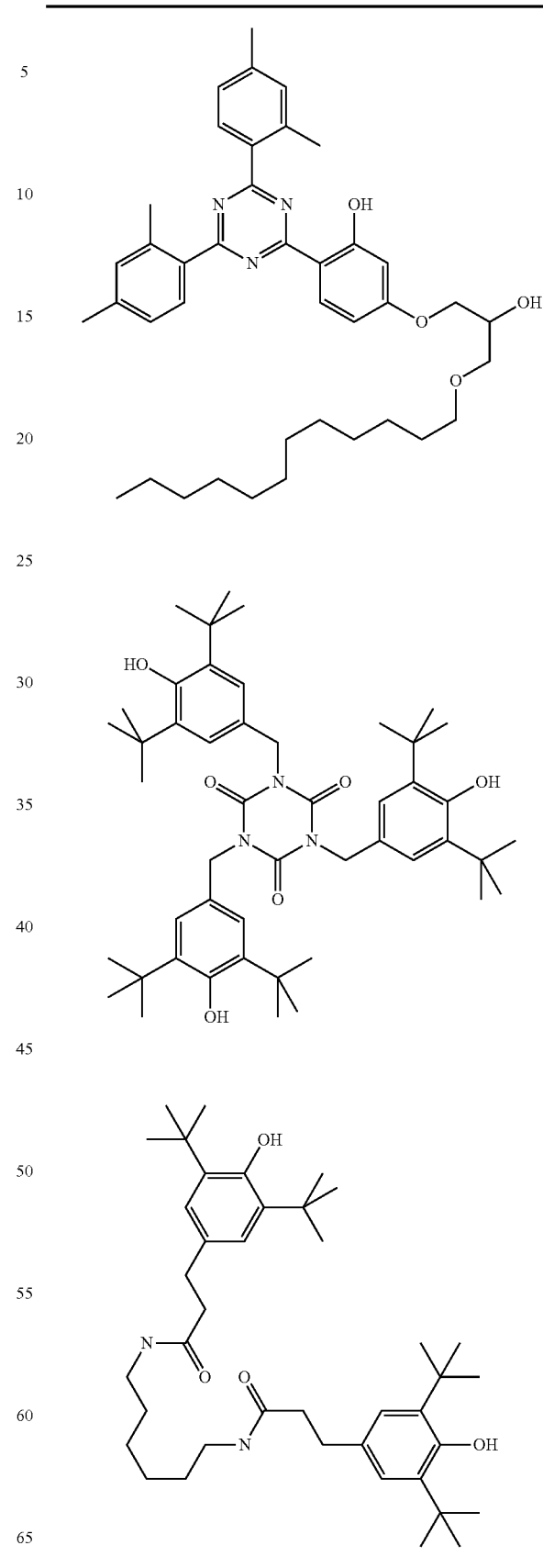

TABLE E-continued

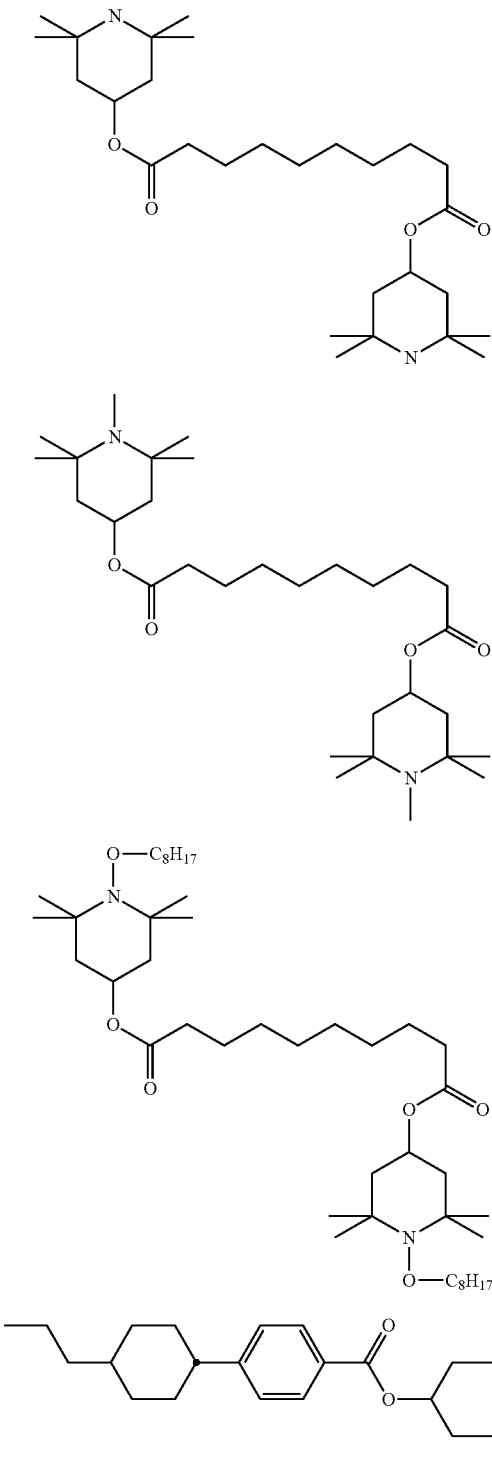

TABLE E-continued

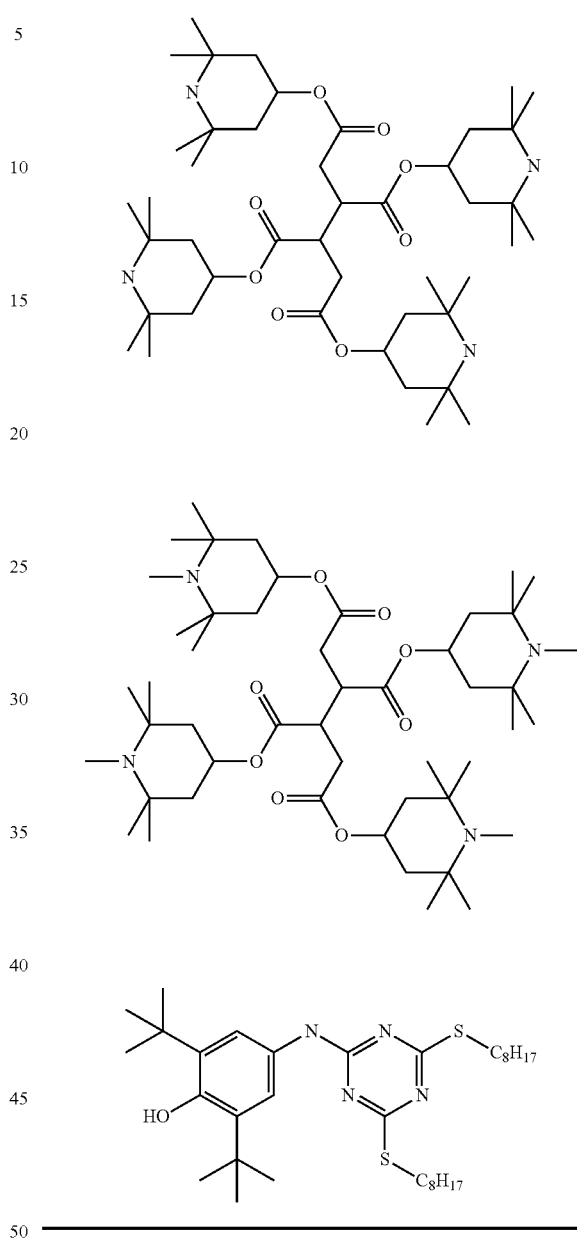

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

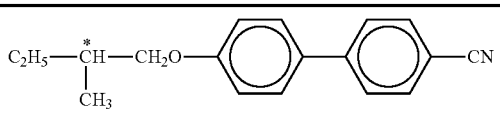

C 15

TABLE F-continued
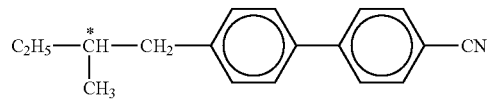
CB 15
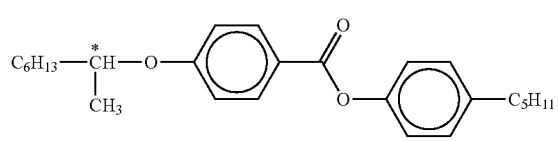
CM 21
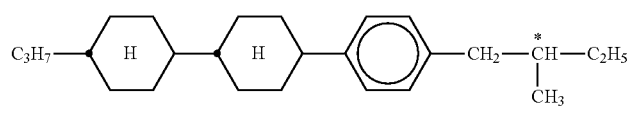
CM 44
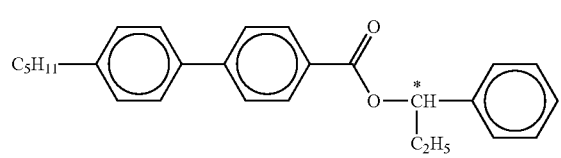
CM 45
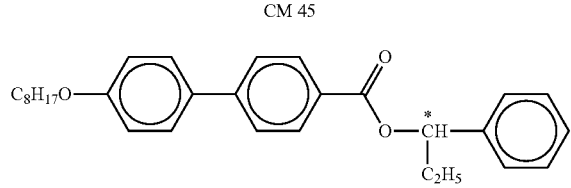
CM 47
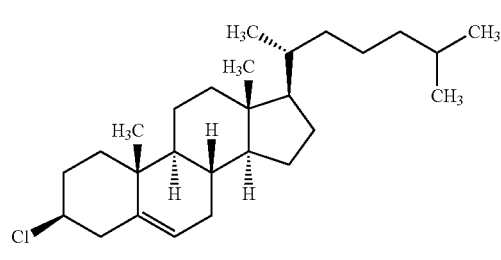
CC
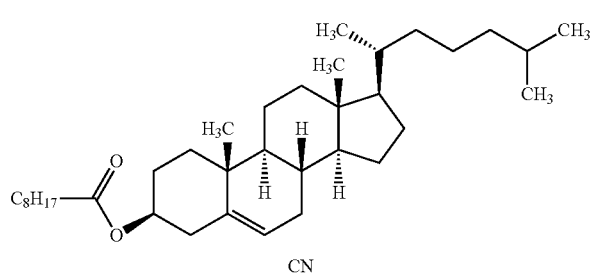
CN
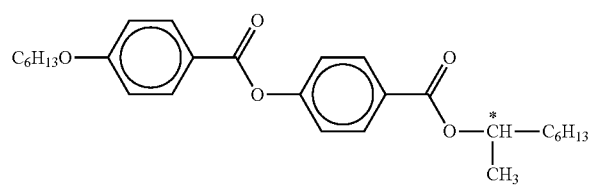
R/S-811

TABLE F-continued

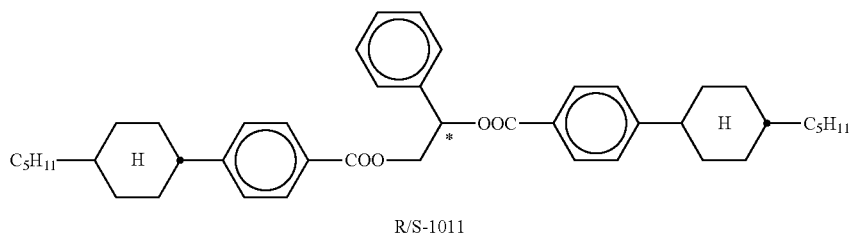

R/S-1011

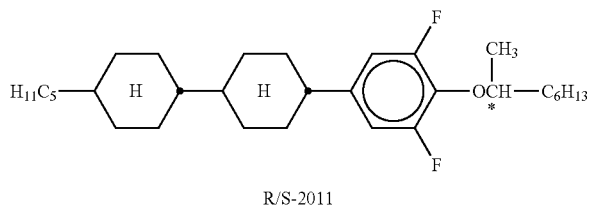

R/S-2011

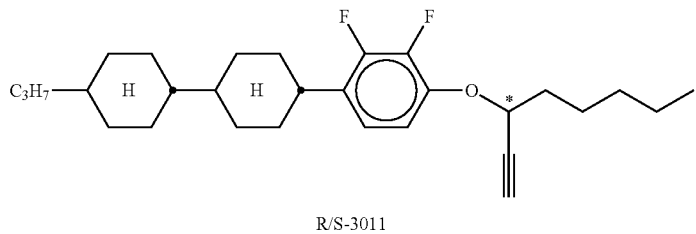

R/S-3011

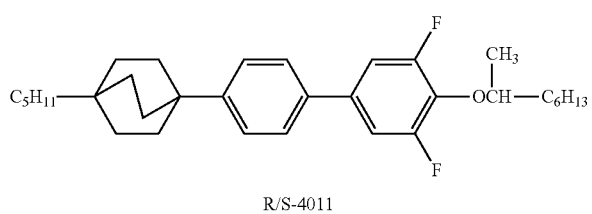

R/S-4011

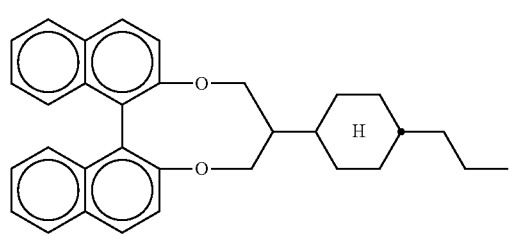

R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise seven or more, preferably eight or more, compounds, preferably compounds having three or more, preferably four or more, different formulae, selected from the group of the compounds from Table D.

EXAMPLES

The following examples illustrate the present invention without limiting it in any way. However, it becomes clear to the person skilled in the art from the physical properties what properties can be achieved and in what ranges they can be modified. In particular, the combination of the various properties which can preferably be achieved is thus well defined for the person skilled in the art.

Example 1

A liquid-crystalline substance having the abbreviated name PTP(2)TP-6-3 is prepared by the method of Hsu, C. S., Shyu, K. F., Chuang, Y. Y. and Wu, S.-T., Liq. Cryst., 27 (2), (2000), pp. 283-287 and investigated with respect to its physical properties, in particular in the microwave range. The compound has a nematic phase and a clearing point (T(N,I)) of 114.5° C. Further physical properties at 20° C. are: $n_e$(589.3 nm)=1.8563; Δn(589.3 nm)=0.3250; $\epsilon_{\parallel}$(1 kHz)=; Δε(1 kHz) and $\gamma_1$=2.100 mPa·s. The compound is suitable for applications in the microwave range, in particular for phase shifters. For comparison, the following values are obtained with the compound 4'-pentyl-4-cyanobiphenyl (also known as 5CB or K15, Merck KGaA) at 20° C.

TABLE 1a

Properties of the compound PTP(2)TP-6-3 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 20 | 3.22 | 2.44 | 0.242 | 0.0018 | 0.0064 | 37.9 |

TABLE 1b

Properties of the compound K15 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 20 | 2.87 | 2.55 | 0.110 | 0.0114 | 0.026 | 4.3 |

TABLE 2

Comparison of the properties of the various examples at 30 GHz and at 20° C.

| Example | Liquid crystal | $\epsilon_{r,\parallel}$ | $\epsilon_{r,\perp}$ | τ | tan $\delta_{\epsilon r,max.}$ | η |
|---|---|---|---|---|---|---|
| Comparison | K15 | 2.87 | 2.55 | 0.110 | 0.0262 | 4.3 |
| 1 | P2-6-3* | 3.22 | 2.44 | 0.242 | 0.0064 | 37.9 |
| 2 | M-1 | t.b.d. | t.b.d. | t.b.d. | t.b.d. | t.b.d. |
| 3 | M-2 | 3.21 | 2.39 | 0.256 | 0.0070 | 35.5 |
| 4 | M-3 | 3.20 | 2.45 | 0.234 | 0.0068 | 34.5 |
| 5 | M-4 | t.b.d. | t.b.d. | t.b.d. | t.b.d. | t.b.d. |
| 6 | M-5 | t.b.d. | t.b.d. | t.b.d. | t.b.d. | t.b.d. |
| 7 | M-6 | 3.26 | 2.46 | 0.245 | 0.0069 | 35.6 |
| 8 | M-7 | 3.20 | 2.42 | 0.244 | 0.0082 | 30.0 |
| 9 | M-8 | 3.24 | 2.45 | 0.244 | 0.0083 | 29.4 |
| 10 | M-9 | t.b.d. | t.b.d. | t.b.d. | t.b.d. | t.b.d. |
| 11 | M-10 | t.b.d. | t.b.d. | t.b.d. | t.b.d. | t.b.d. |
| 12 | M-11 | 3.19 | 2.42 | 0.241 | 0.0075 | 33.0 |
| 13 | M-12 | t.b.d. | t.b.d. | t.b.d. | t.b.d. | t.b.d. |
| 14 | M-13 | t.b.d. | t.b.d. | t.b.d. | t.b.d. | t.b.d. |
| 15 | M-14 | t.b.d. | t.b.d. | t.b.d. | t.b.d. | t.b.d. |
| 16 | M-15 | t.b.d. | t.b.d. | t.b.d. | t.b.d. | t.b.d. |
| 17 | M-16 | t.b.d. | t.b.d. | t.b.d. | t.b.d. | t.b.d. |
| 18 | M-17 | t.b.d. | t.b.d. | t.b.d. | t.b.d. | t.b.d. |
| 19 | M-18 | t.b.d. | t.b.d. | t.b.d. | t.b.d. | t.b.d. |
| 20 | M-19 |  |  | 0.224 |  | 18.3 |
| 21 | M-20 | t.b.d. | t.b.d. | t.b.d. | t.b.d. | t.b.d. |
| 22 | M-21 | t.b.d. | t.b.d. | t.b.d. | t.b.d. | t.b.d. |
| 23 | M-22 | t.b.d. | t.b.d. | t.b.d. | t.b.d. | t.b.d. |

Notes:
*P2-6-3: PTP(2)TP-6-3 and
t.b.d.: to be determined.

Example 2

A liquid-crystal mixture M-1 having the composition and properties as indicated in the following table is prepared.

| Composition | | |
|---|---|---|
| Compound | | |
| No. | Abbreviation | |
| 1 | PTP(2)TP-3-3 | 25.0 |
| 2 | PTP(2)TP-4-3 | 25.0 |
| 3 | PTP(2)TP-6-3 | 50.0 |
| Σ | | 100.0 |

Physical properties

T(N, I) = 123.0° C.
$\epsilon_{\parallel}$ (20° C., 1 kHz) = 3.4
Δε (20° C., 1 kHz) = 0.8

Note:
The compounds PTP(2)TP-3-3 and PTP(2)TP-4-3 are prepared analogously to the compound of Example 1.

This mixture is very suitable for applications in the microwave range, in particular for phase shifters.

Example 3

A liquid-crystal mixture M-2 having the composition and properties as indicated in the following table is prepared.

| Composition | | |
|---|---|---|
| Compound | | |
| No. | Abbreviation | |
| 1 | PTP(1)TP-3-6 | 11.0 |
| 2 | PTP(1)TP-3-O5 | 5.0 |
| 3 | PTP(2)TP-3-6 | 15.0 |
| 4 | PTP(2)TP-6-3 | 63.0 |
| 5 | PTP(2)TP-3-O5 | 6.0 |
| Σ | | 100.0 |

Physical properties

T(N, I) = 129.5° C.
$n_e$ (20° C., 589.3 nm) = 1.8721
Δn (20° C., 589.3 nm) = 0.3430
$\epsilon_{\parallel}$ (20° C., 1 kHz) = 3.3
Δε (20° C., 1 kHz) = 0.7

This mixture is very suitable for applications in the microwave range, in particular for phase shifters.

TABLE 3

Properties of mixture M-2 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 20 | 3.21 | 2.39 | 0.256 | 0.0020 | 0.0070 | 35.5 |

Example 4

A liquid-crystal mixture M-3 having the composition and properties as indicated in the following table is prepared.

| Composition Compound | | |
|---|---|---|
| No. | Abbreviation | |
| 1 | PTP(2)TP-3-3 | 40.0 |
| 2 | PTP(2)TP-6-3 | 20.0 |
| 3 | PTP(2)TP-3-O5 | 20.0 |
| 4 | PTP(c6)TP-3-6 | 20.0 |
| Σ | | 100.0 |

| Physical properties |
|---|
| T(N, I) = 112.5° C. |
| $\epsilon_\parallel$ (20° C., 1 kHz) = 3.5 |
| $\Delta\epsilon$ (20° C., 1 kHz) = 0.8 |

Note:
The compounds are all prepared analogously to the compound of Example 1. The compound PTP(c6)TP-3-6 has a glass transition temperature ($T_g$) of −23° C.

This mixture is very suitable for applications in the microwave range, in particular for phase shifters.

TABLE 4

| Properties of mixture M-3 at 30 GHz | | | | | |
|---|---|---|---|---|---|
| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
| 20 | 3.20 | 2.45 | 0.234 | 0.0023 | 0.0068 | 34.5 |

Example 5

A liquid-crystal mixture M-4 having the composition and properties as indicated in the following table is prepared.

| Composition Compound | | |
|---|---|---|
| No. | Abbreviation | |
| 1 | PTP(2)TP-3-3 | 40.0 |
| 2 | PTP(2)TP-6-3 | 20.0 |
| 3 | PTP(2)TP-3-O5 | 20.0 |
| 4 | PTP(c3)TP-4-4 | 20.0 |
| Σ | | 100.0 |

| Physical properties |
|---|
| T(N, I) = t.b.d. ° C. |
| $\epsilon_\parallel$ (20° C., 1 kHz) = t.b.d. |
| $\Delta\epsilon$ (20° C., 1 kHz) = t.b.d. |

Notes:
t.b.d.: to be determined.
The compounds are all prepared analogously to the compound of Example 1. The compound PTP(c3)TP-4-4 has a nematic phase and a clearing point of 84.5° C.

This mixture is very suitable for applications in the microwave range, in particular for phase shifters.

Example 6

A liquid-crystal mixture M-5 having the composition and properties as indicated in the following table is prepared.

| Composition Compound | | |
|---|---|---|
| No. | Abbreviation | |
| 1 | PTP(2)TP-3-3 | 40.0 |
| 2 | PTP(2)TP-6-3 | 20.0 |
| 3 | PTP(2)TP-3-O5 | 20.0 |
| 4 | PTP(c4)TP-4-4 | 20.0 |
| Σ | | 100.0 |

| Physical properties |
|---|
| T(N, I) = t.b.d. ° C. |
| $\epsilon_\parallel$ (20° C., 1 kHz) = t.b.d. |
| $\Delta\epsilon$ (20° C., 1 kHz) = t.b.d. |

Notes:
t.b.d.: to be determined.
The compounds are all prepared analogously to the compound of Example 1. The compound PTP(c4)TP-4-4 has a nematic phase and a clearing point of 70.1° C.

This mixture is very suitable for applications in the microwave range, in particular for phase shifters.

Example 7

A liquid-crystal mixture M-6 having the composition and properties as indicated in the following table is prepared.

| Composition Compound | | |
|---|---|---|
| No. | Abbreviation | |
| 1 | PTP(2)TP-2-2 | 15.0 |
| 2 | PTP(2)TP-3-3 | 20.0 |
| 3 | PTP(2)TP-6-3 | 30.0 |
| 4 | PTP(2)TP-3-O5 | 15.0 |
| 5 | PTP(c6)TP-3-6 | 20.0 |
| Σ | | 100.0 |

| Physical properties |
|---|
| T(N, I) = 105.0° C. |
| $\epsilon_\parallel$ (20° C., 1 kHz) = 3.5 |
| $\Delta\epsilon$ (20° C., 1 kHz) = 0.8 |

This mixture is very suitable for applications in the microwave range, in particular for phase shifters.

TABLE 5

| Properties of mixture M-6 at 30 GHz | | | | | |
|---|---|---|---|---|---|
| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
| 20 | 3.26 | 2.46 | 0.245 | 0.0020 | 0.0069 | 35.6 |

Example 8

A liquid-crystal mixture M-7 having the composition and properties as indicated in the following table is prepared.

| Composition Compound | | |
|---|---|---|
| No. | Abbreviation | |
| 1 | PTP(1)TP-3-6 | 15.0 |
| 2 | PTP(2)TP-3-6 | 10.0 |
| 3 | PTP(2)TP-6-3 | 55.0 |
| 4 | PTP(2)TP-3-O5 | 5.0 |
| 5 | PGUQU-3-F | 5.0 |
| 6 | PGUQU-4-F | 5.0 |
| 7 | PGUQU-5-F | 5.0 |
| Σ | | 100.0 |

Physical properties

T(N, I) = 124.5° C.
$\epsilon_{\parallel}$ (20° C., 1 kHz) = 7.4
Δε (20° C., 1 kHz) = 4.5
$\gamma_1$ (20° C.) = 1.637 mPa · s This mixture is very suitable for applications in the microwave range, in particular for phase shifters.

TABLE 6

Properties of mixture M-7 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 10.0 | 3.21 | 2.41 | 0.248 | 0.0021 | 0.0070 | 35.3 |
| 20.0 | 3.20 | 2.42 | 0.244 | 0.0024 | 0.0082 | 30.0 |
| 30.0 | 3.19 | 2.42 | 0.240 | 0.0027 | 0.0093 | 26.0 |
| 40.0 | 3.17 | 2.42 | 0.236 | 0.0030 | 0.0104 | 22.6 |
| 50.0 | 3.15 | 2.42 | 0.231 | 0.0035 | 0.0115 | 20.1 |

Example 9

A liquid-crystal mixture M-8 having the composition and properties as indicated in the following table is prepared.

| Composition Compound | | |
|---|---|---|
| No. | Abbreviation | |
| 1 | PTP(1)TP-6-3 | 17.2 |
| 2 | PTP(2)TP-3-3 | 34.4 |
| 3 | PTP(2)TP-3-O5 | 17.2 |
| 4 | PTP(c6)TP-3-6 | 17.2 |
| 5 | PGUQU-3-F | 7.0 |
| 6 | PGUQU-5-F | 7.0 |
| Σ | | 100.0 |

Physical properties

T(N, I) = 108.5° C.
$\epsilon_{\parallel}$ (20° C., 1 kHz) = 7.0
Δε (20° C., 1 kHz) = 4.0
$\gamma_1$ (20° C.) = 1.126 mPa · s

TABLE 7

Properties of mixture M-8 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 20 | 3.24 | 2.45 | 0.244 | 0.0024 | 0.0083 | 29.4 |

Example 10

A liquid-crystal mixture M-9 having the composition and properties as indicated in the following table is prepared.

| Composition Compound | | |
|---|---|---|
| No. | Abbreviation | |
| 1 | PTP(1)TP-6-3 | 17.2 |
| 2 | PTP(2)TP-3-3 | 34.4 |
| 3 | PTP(2)TP-3-O5 | 17.2 |
| 4 | PTP(c3)TP-4-4 | 17.2 |
| 5 | PGUQU-3-F | 7.0 |
| 6 | PGUQU-5-F | 7.0 |
| Σ | | 100.0 |

Physical properties

T(N, I) = t.b.d. ° C.
$\epsilon_{\parallel}$ (20° C., 1 kHz) = t.b.d.
Δε (20° C., 1 kHz) = t.b.d.

Note:
t.b.d.: to be determined.

Example 11

A liquid-crystal mixture M-10 having the composition and properties as indicated in the following table is prepared.

| Composition Compound | | |
|---|---|---|
| No. | Abbreviation | |
| 1 | PTP(1)TP-6-3 | 17.2 |
| 2 | PTP(2)TP-3-3 | 34.4 |
| 3 | PTP(2)TP-3-O5 | 17.2 |
| 4 | PTP(c4)TP-4-4 | 17.2 |
| 5 | PGUQU-3-F | 7.0 |
| 6 | PGUQU-5-F | 7.0 |
| Σ | | 100.0 |

Physical properties

T(N, I) = t.b.d. ° C.
$\epsilon_{\parallel}$ (20° C., 1 kHz) = t.b.d.
Δε (20° C., 1 kHz) = t.b.d.

Note:
t.b.d.: to be determined.

Example 12

A liquid-crystal mixture M-11 having the composition and properties as indicated in the following table is prepared.

| Composition Compound | | |
|---|---|---|
| No. | Abbreviation | |
| 1 | PTP(1)TP-3-6 | 15.0 |
| 2 | PTP(2)TP-3-6 | 20.0 |
| 3 | PTP(2)TP-6-3 | 45.0 |

-continued

| | | |
|---|---|---|
| 4 | PTP(2)TP-3-O5 | 10.0 |
| 5 | CPWZG-3-N | 10.0 |
| Σ | | 100.0 |

| Physical properties |
|---|
| T(N, I) = 139.5° C.<br>$\epsilon_\parallel$ (20° C., 1 kHz) = 5.0<br>Δ$\epsilon$ (20° C., 1 kHz) = 2.0 |

Notes:
CPWZG-3-N: (phases: C 104 SA (79) N 169.4 I)

This mixture is very suitable for applications in the microwave range, in particular for phase shifters.

TABLE 8

Properties of mixture M-11 at 30 GHz

| T/° C. | $\epsilon_{r,\parallel}$ | $\epsilon_{r,\perp}$ | τ | tan $\delta_{\epsilon,r,\parallel}$ | tan $\delta_{\epsilon,r,\perp}$ | η |
|---|---|---|---|---|---|---|
| 20 | 3.19 | 2.42 | 0.241 | 0.0020 | 0.0075 | 33.0 |

Example 13

A liquid-crystal mixture M-12 having the composition and properties as indicated in the following table is prepared.

| Composition Compound | | |
|---|---|---|
| No. | Abbreviation | |
| 1 | PTP(2)TP-6-3 | 60.0 |
| 2 | PTYY-3-O2 | 10.0 |
| 3 | PTYY-3-O3 | 15.0 |
| 4 | PTYY-3-O4 | 15.0 |
| Σ | | 100.0 |

| Physical properties |
|---|
| T(N, I) = 141.5° C.<br>$\epsilon_\parallel$ (20° C., 1 kHz) = 6.0<br>Δ$\epsilon$ (20° C., 1 kHz) = −0.5 |

This mixture is very suitable for applications in the microwave range, in particular for phase shifters.

Example 14

A liquid-crystal mixture M-13 having the composition and properties as indicated in the following table is prepared.

| Composition Compound | | |
|---|---|---|
| No. | Abbreviation | |
| 1 | PTP(2)TP-6-3 | 75.0 |
| 2 | PfX-5-O4 | 25.0 |
| Σ | | 100.0 |

| Physical properties |
|---|
| T(N, I) = 137.5° C.<br>$\epsilon_\parallel$ (20° C., 1 kHz) = 5.2<br>Δ$\epsilon$ (20° C., 1 kHz) = −0.5 |

This mixture is very suitable for applications in the microwave range, in particular for phase shifters.

Example 15

A liquid-crystal mixture M-14 having the composition and properties as indicated in the following table is prepared.

| Composition Compound | | |
|---|---|---|
| No. | Abbreviation | |
| 1 | PTP(1)TP-3-6 | 10.0 |
| 2 | PTP(2)TP-3-6 | 15.0 |
| 3 | PTP(2)TP-6-3 | 35.0 |
| 4 | PTYY-3-O2 | 5.0 |
| 5 | PTYY-3-O3 | 10.0 |
| 6 | PTYY-3-O4 | 10.0 |
| 7 | PfX-5-O4 | 15.0 |
| Σ | | 100.0 |

| Physical properties |
|---|
| T(N, I) = t.b.d. ° C.<br>$\epsilon_\parallel$ (20° C., 1 kHz) = t.b.d.<br>Δ$\epsilon$ (20° C., 1 kHz) = t.b.d. |

Note:
t.b.d.: to be determined.

This mixture is very suitable for applications in the microwave range, in particular for phase shifters.

Example 16

A liquid-crystal mixture M-15 having the composition and properties as indicated in the following table is prepared.

| Composition Compound | | |
|---|---|---|
| No. | Abbreviation | |
| 1 | PTP(2)TP-3-1 | 10.0 |
| 2 | PTP(2)TP-6-3 | 63.0 |
| 3 | PTP(2)TP-3-O5 | 10.0 |
| 4 | PGUQU-3-F | 5.0 |
| 5 | PU[QGU]$_2$-3-F | 5.0 |
| 6 | PU[QGU]$_2$-5-F | 7.0 |
| Σ | | 100.0 |

| Physical properties |
|---|
| T(N, I) = t.b.d. ° C.<br>$\epsilon_\parallel$ (20° C., 1 kHz) = t.b.d.<br>Δ$\epsilon$ (20° C., 1 kHz) = t.b.d. |

Notes:
PU[QGU]$_2$-5-F: PUQGUQGU-5-F (phases: C 86 N 236.4 I)
PU[QGU]$_2^{(3)}$-5-F: PUQGU(3)QGU-5-F (phases: C 80° C. S$_A$ (39) N 100.6 I) and
t.b.d.: to be determined.

Example 17

A liquid-crystal mixture M-16 having the composition and properties as indicated in the following table is prepared.

| | Composition Compound | |
|---|---|---|
| No. | Abbreviation | |
| 1 | PTP(2)TP-6-3 | 85.0 |
| 2 | PU[QGU]$_2$-5-F | 10.0 |
| 3 | PU[QGU]$_2^{(3)}$-5-F | 5.0 |
| Σ | | 100.0 |

Physical properties

T(N, I) = 118.5° C.
$\epsilon_\parallel$ (20° C., 1 kHz) = 5.7
Δε (20° C., 1 kHz) = 2.8
k$_1$ (20° C.) = 13.9
k$_3$ (20° C.) = 35.7

Notes:
PU[QGU]$_2$-3-F: PUQGUQGU-3-F,
PU[QGU]$_2$-5-F: PUQGUQGU-5-F.

Example 18

A liquid-crystal mixture M-17 having the composition and properties as indicated in the following table is prepared.

| | Composition Compound | |
|---|---|---|
| No. | Abbreviation | |
| 1 | PTP(c3)TP-4-4 | 15.0 |
| 2 | GGP-3-CL | 10.0 |
| 3 | GGP-5-CL | 20.0 |
| 4 | PPTUI-3-2 | 20.0 |
| 5 | PPTUI-3-4 | 20.0 |
| 6 | PPTUI-4-4 | 5.0 |
| 7 | CPGP-5-2 | 5.0 |
| 8 | CPGP-5-2 | 5.0 |
| Σ | | 100.0 |

Physical properties

T(N, I) = 152.0° C.
T(S, N) < −20° C.
$\epsilon_\parallel$ (20° C., 1 kHz) = 7.6
Δε (20° C., 1 kHz) = 4.1

This mixture is very suitable for applications in the microwave range, in particular for phase shifters.

Example 19

A liquid-crystal mixture M-18 having the composition and properties as indicated in the following table is prepared.

| | Composition Compound | |
|---|---|---|
| No. | Abbreviation | |
| 1 | PTP(c3)TP-4-4 | 20.0 |
| 2 | GGP-3-CL | 10.0 |
| 3 | GGP-5-CL | 20.0 |
| 4 | PPTUI-3-4 | 20.0 |
| 5 | PPTUI-4-4 | 20.0 |
| 6 | CPGP-5-2 | 5.0 |
| 7 | CPGP-5-2 | 5.0 |
| Σ | | 100.0 |

Physical properties

T(N, I) = 145.5° C.
T(C, I) = −10° C.
$\epsilon_\parallel$ (20° C., 1 kHz) = 7.0
Δε (20° C., 1 kHz) = 4.0
$\gamma_1$ (20° C.) = 1.237 mPa · s
k$_1$ (20° C.) = 15.9
k$_3$ (20° C.) = 27.5
V$_0$ (20° C.) = 2.11 V This mixture is very suitable for applications in the microwave range, in particular for phase shifters.

TABLE 9

Properties of mixture M-18 at 30 GHz

| T/° C. | τ | η |
|---|---|---|
| 10.0 | 0.227 | 22.0 |
| 20.0 | 0.224 | 18.3 |
| 30.0 | 0.220 | 15.2 |
| 40.0 | 0.215 | 13.4 |
| 50.0 | 0.211 | 11.7 |
| 60.0 | 0.207 | 10.4 |
| 70.0 | 0.202 | 9.1 |
| 80.0 | 0.196 | 8.0 |
| 90.0 | 0.190 | 7.2 |
| 92.3 | 0.188 | 7.0 |

Example 20

A liquid-crystal mixture M-19 having the composition and properties as indicated in the following table is prepared.

| | Composition Compound | |
|---|---|---|
| No. | Abbreviation | |
| 1 | PTP(2)TP-6-3 | 20.0 |
| 2 | PTP(c3)TP-4-4 | 5.0 |
| Σ | | 100.0 |

Physical properties

T(N, I) = 113.5° C.
$\epsilon_\parallel$ (20° C., 1 kHz) = t.b.d.
Δε (20° C., 1 kHz) = t.b.d.

Note:
t.b.d.: to be determined.

This mixture is very suitable for applications in the microwave range, in particular for phase shifters.

Example 21

A liquid-crystal mixture M-20 having the composition and properties as indicated in the following table is prepared.

| Composition Compound | | |
|---|---|---|
| No. | Abbreviation | |
| 1 | PTP(2)TP-2-2 | 20.0 |
| 2 | PTP(2)TP-3-3 | 30.0 |
| 3 | PTP(2)TP-6-3 | 10.0 |
| 4 | PTP(c6)TP-3-6 | 20.0 |
| 5 | PTP(2)TP-3-O5 | 20.0 |
| Σ | | 100.0 |

| Physical properties |
|---|
| T(N, I) = t.b.d. ° C. |
| $\epsilon_\parallel$ (20° C., 1 kHz) = t.b.d. |
| Δ$\epsilon$ (20° C., 1 kHz) = t.b.d. |

Note:
t.b.d.: to be determined.

This mixture is very suitable for applications in the microwave range, in particular for phase shifters.

Example 22

A liquid-crystal mixture M-21 having the composition and properties as indicated in the following table is prepared.

| Composition Compound | | |
|---|---|---|
| No. | Abbreviation | |
| 1 | PTP(2)TP-3-3 | 10.0 |
| 2 | PTP(2)TP-3-6 | 10.0 |
| 3 | PTP(2)TP-4-3 | 10.0 |
| 4 | PTP(2)TP-6-3 | 70.0 |
| Σ | | 100.0 |

| Physical properties |
|---|
| T(N, I) = t.b.d. ° C. |
| $\epsilon_\parallel$ (20° C., 1 kHz) = t.b.d. |
| Δ$\epsilon$ (20° C., 1 kHz) = t.b.d. |

Note:
t.b.d.: to be determined.

This mixture is very suitable for applications in the microwave range, in particular for phase shifters.

Example 23

A liquid-crystal mixture M-22 having the composition and properties as indicated in the following table is prepared.

| Composition Compound | | |
|---|---|---|
| No. | Abbreviation | |
| 1 | PTP(2)TP-3-3 | 25.0 |
| 2 | PTP(2)TP-4-3 | 25.0 |
| 3 | PTP(2)TP-6-3 | 50.0 |
| Σ | | 100.0 |

| Physical properties |
|---|
| T(N, I) = 123.0° C. |
| $\epsilon_\parallel$ (20° C., 1 kHz) = 3.4 |
| Δ$\epsilon$ (20° C., 1 kHz) = 0.8 |

This mixture is very suitable for applications in the microwave range, in particular for phase shifters.

The invention claimed is:

1. Component which operates in the microwave range or millimeter wave range of the electromagnetic spectrum, wherein the component is selected from the group consisting of the following components: wireless and radiowave antenna arrays; microwave antenna arrays; and devices selected from the group consisting of the following devices: phase shifters; varactors; and matching circuit adaptive filters; and wherein the component comprises a liquid-crystal medium, wherein the medium comprises two or more compounds of the formula I, wherein the concentration of all of the compounds of formula I is 30 to 95% by weight, based on the total weight of the medium,

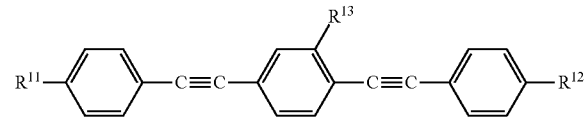

I in which
$R^{11}$ and $R^{12}$, independently of one another, denote unfluorinated alkyl having 1 to 15 C atoms, or unfluorinated alkenyl having 2 to 15 C atoms,
$R^{13}$ denotes ethyl or cycloalkyl having 3 to 6 carbon atoms,
provided that:
the liquid-crystal medium contains one or more compounds of the formula I-2

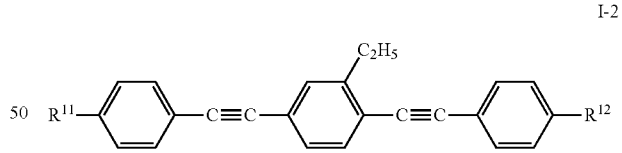

I-2 and contains one or more compounds of the formula I-3

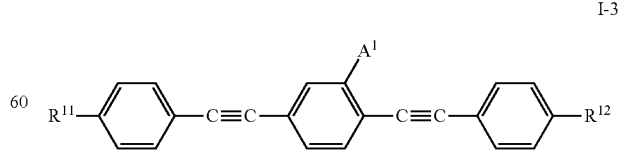

I-3 wherein $A^1$ denotes cycloalkyl having 3 to 6 C atoms; and wherein the liquid-crystal medium additionally comprises one or more components selected from the group of the following components, components B and D to E, a strongly dielectrically positive component, component B, which has a dielectric anisotropy of 10 or more, a component, component D, which has a dielectric anisotropy in the range from more than −5.0 to less than 10.0 and comprises one or more compounds of the following formula IV:

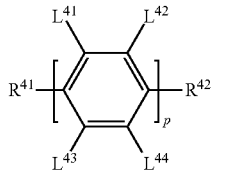

IV in which $R^{41}$ and $R^{42}$, independently of one another, denote unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, $L^{41}$ to $L^{44}$ on each appearance, in each case independently of one another, denote H, alkyl having 1 to 5 C atoms, F or Cl, provided that at least two of the substituents $L^{41}$ to $L^{44}$ are not H, and P denotes an integer in the range from 7 to 14;

and a component, component E, which has a dielectric anisotropy in the range from more than −5.0 to less than 10.0 and comprises one or more compounds of the formulae V to IX:

V

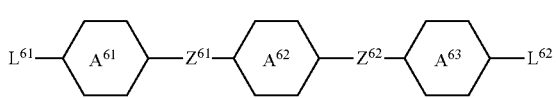

VI

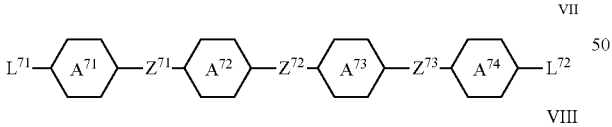

VII

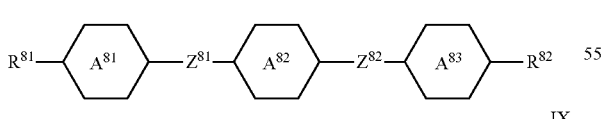

VIII

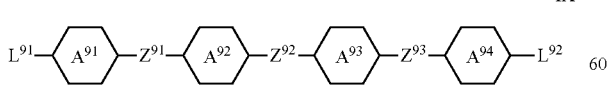

IX in which $L^{51}$ denotes $R^{51}$ or $X^{51}$,
$L^{52}$ denotes $R^{52}$ or $X^{52}$,
$R^{51}$ and $R^{52}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, $X^{51}$ and $X^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, and

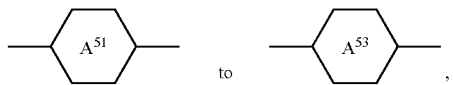

independently of one another, denote

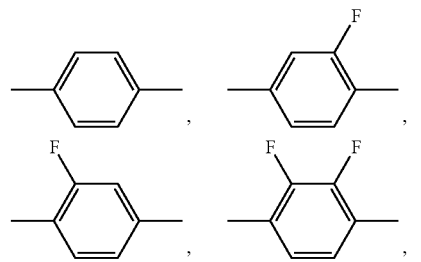

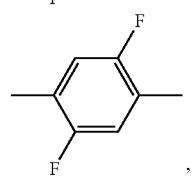

$L^{61}$ denotes $R^{21}$ and, in the case where $Z^{61}$ and/or $Z^{62}$ denote trans-CH=CH— or trans-CF=CF—, alternatively denotes $X^{21}$, $L^{62}$ denotes $R^{62}$ and, in the case where $Z^{61}$ and/or $Z^{62}$ denote trans-CH=CH— or trans-CF=CF—, alternatively denotes $X^{62}$, $R^{61}$ and $R^{62}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, $X^{61}$ and $X^{62}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms, one of $Z^{61}$ and $Z^{62}$ denotes trans-CH=CH—, trans-CF=CF— or —C≡C— and the other, independently thereof, denotes trans-CH=CH—, trans-CF=CF— or a single bond, and

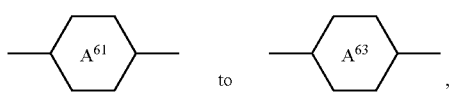

independently of one another, denote

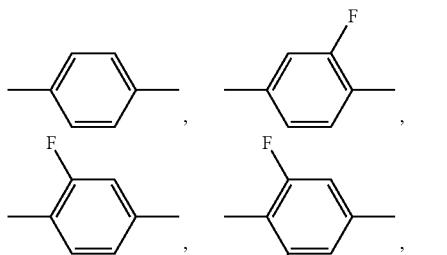

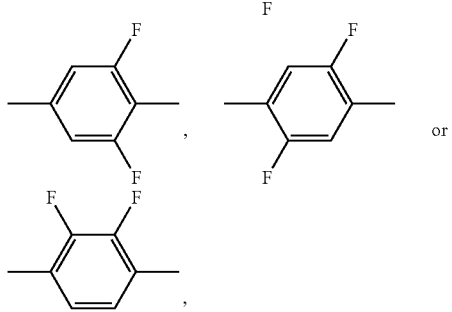

L$^{71}$ denotes R$^{71}$ or X$^{71}$,

L$^{72}$ denotes R$^{72}$ or X$^{72}$,

R$^{71}$ and R$^{72}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, X$^{71}$ and X$^{72}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, and Z$^{71}$ to Z$^{73}$, independently of one another, denote trans-CH=CH—, trans-CF=CF—, —C≡C— or a single bond, and

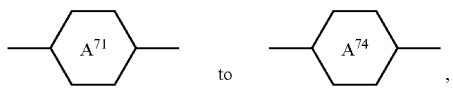

independently of one another, denote

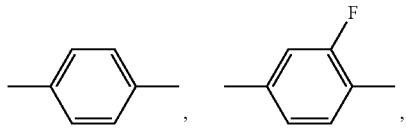

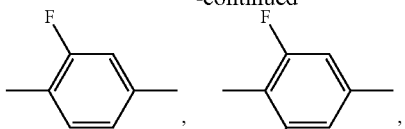

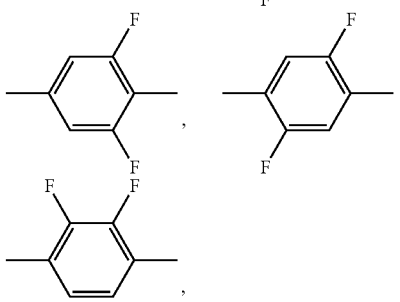

R$^{81}$ and R$^{82}$, independently of one another, denote H, unfluorinated alkyl or alkoxy having 1 to 15 C atoms or unfluorinated alkenyl, alkenyloxy or alkoxyalkyl having 2 to 15 C atoms, one of Z$^{81}$ and Z$^{82}$ denotes trans-CH=CH—, trans-CF=CF— or —C≡C— and the other, independently thereof, denotes trans-CH=CH—, trans-CF=CF— or a single bond, and

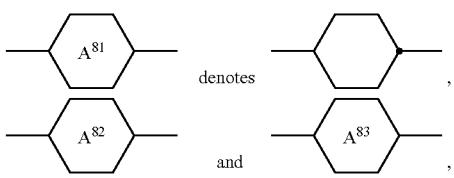

independently of one another, denote

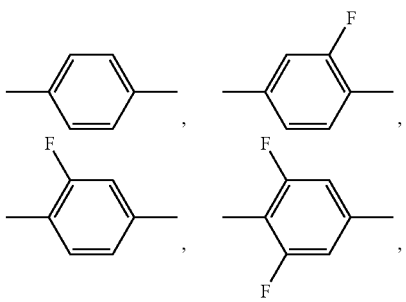

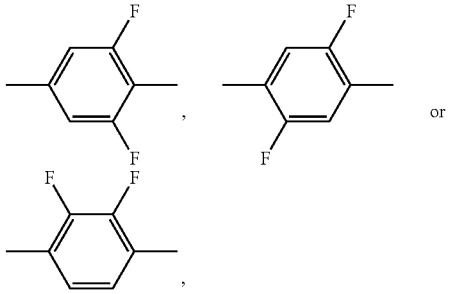

L$^{91}$ denotes R$^{91}$ or X$^{91}$,

L$^{92}$ denotes R$^{92}$ or X$^{92}$, $R^{91}$ and $R^{92}$, independently of one another, denote H, unfluorinated alkyl or alkoxy having 1 to 15 C atoms or unfluorinated alkenyl, alkenyloxy or alkoxyalkyl having 2 to 15 C atoms, $X^{91}$ and $X^{92}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, and $Z^{91}$ to $Z^{93}$, independently of one another, denote trans-CH=CH—, trans-CF=CF—, —C≡C— or a single bond,

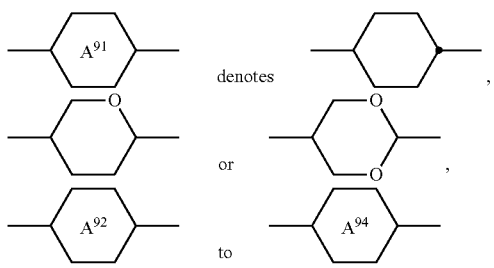

independently of one another, denote

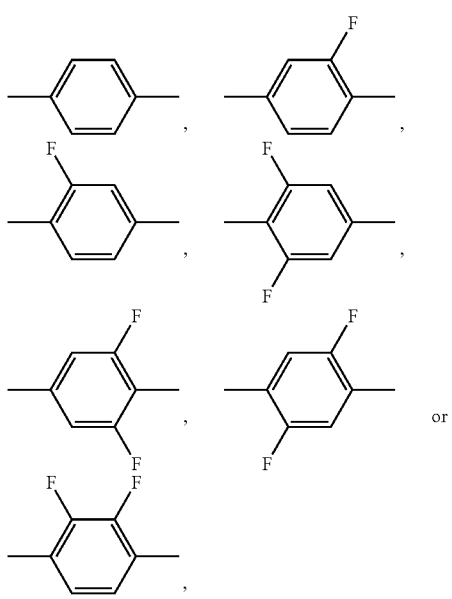

and where compounds of the formula IIIA

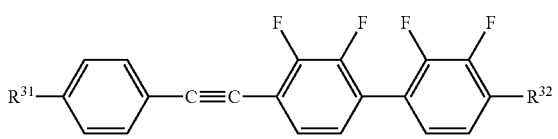

IIIA where $R^{31}$ and $R^{32}$ denote unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, are excluded from the compounds of the formula VI.

2. Component according to claim 1, wherein the liquid-crystal medium additionally comprises:
a strongly dielectrically negative component, component C, which has a dielectric anisotropy having a value of −5.0 or less.

3. Component according to claim 1, characterised in that the liquid-crystal medium comprises a component B.

4. Component according to claim 1, characterised in that the liquid-crystal medium comprises a component D.

5. Liquid-crystal medium, characterised in that it comprises
a component A comprising two or more compounds of the formula I wherein the concentration of all of the compounds of formula I is 30 to 95% by weight, based on the total weight of the medium,

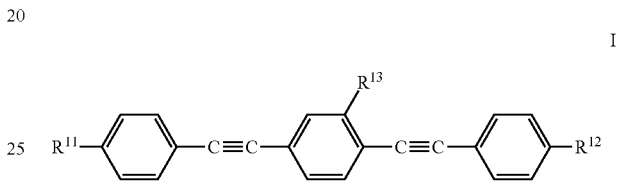

I in which
$R^{11}$ and $R^{12}$, independently of one another, denote unfluorinated alkyl having 1 to 15 C atoms, or unfluorinated alkenyl having 2 to 15 C atoms,
$R^{13}$ denotes ethyl or cycloalkyl having 3 to 6 carbon atoms,
provided that:
the liquid-crystal medium contains one or more compounds of the formula I-2

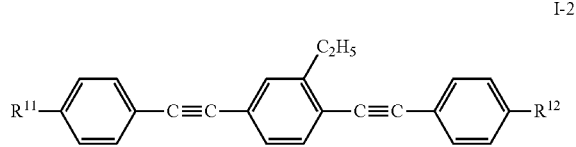

I-2 and contains one or more compounds of the formula I-3

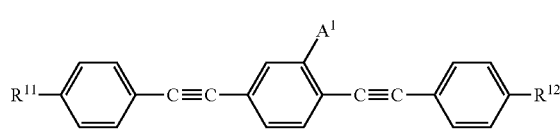

I-3 wherein $A^1$ denotes cycloalkyl having 3 to 6 C atoms, and
additionally comprises one or more components selected from the group of the following components B, D and E:
a strongly dielectrically positive component, component B, which has a dielectric anisotropy of 10 or more,
a component, component D, which has a dielectric anisotropy in the range from more than −5.0 to less than 10.0 and comprises one or more compounds of the following formula IV:

IV

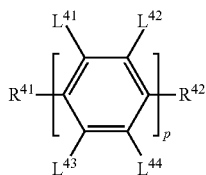

in which
R$^{41}$ and R$^{42}$, independently of one another, denote unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms,
L$^{41}$ to L$^{44}$ on each appearance, in each case independently of one another, denote H, alkyl having 1 to 5 C atoms, F or Cl, provided that at least two of the substituents L$^{41}$ to L$^{44}$ are not H, and
P denotes an integer in the range from 7 to 14;
and
a component, component E, which has a dielectric anisotropy in the range from more than −5.0 to less than 10.0 and comprises one or more compounds of the formulae V to IX:

V

VI

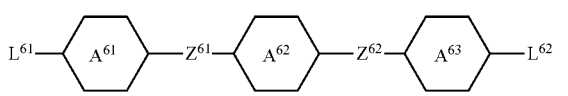

VII

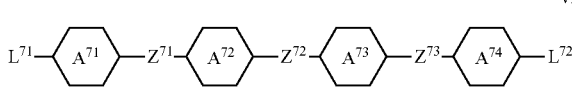

VIII

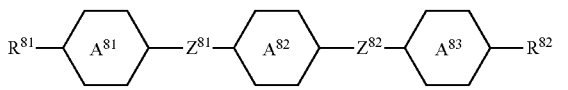

IX

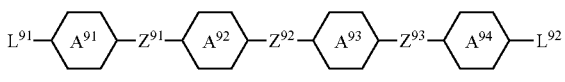

in which
L$^{51}$ denotes R$^{51}$ or X$^{51}$,
L$^{52}$ denotes R$^{52}$ or X$^{52}$,
R$^{51}$ and R$^{52}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{51}$ and X$^{52}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, provided that X$^{51}$ is not —CN, and

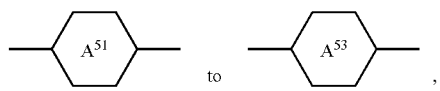

independently of one another, denote

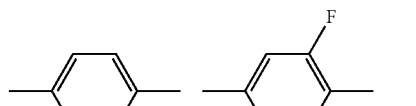

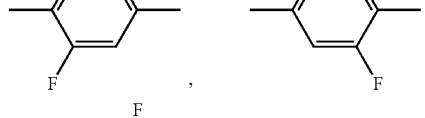

or

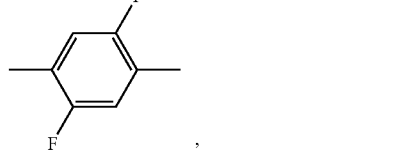

L$^{61}$ denotes R$^{21}$ and, in the case where Z$^{61}$ and/or Z$^{62}$ denote trans-CH=CH— or trans-CF=CF—, alternatively denotes X$^{21}$,
L$^{62}$ denotes R$^{62}$ and, in the case where Z$^{61}$ and/or Z$^{62}$ denote trans-CH=CH— or trans-CF=CF—, alternatively denotes X$^{62}$,
R$^{61}$ and R$^{62}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{61}$ and X$^{62}$, independently of one another, denote F or Cl, —CN, —NCS, —SF$_5$, fluorinated alkyl or alkoxy having 1 to 7 C atoms or fluorinated alkenyl, alkenyloxy or alkoxyalkyl having 2 to 7 C atoms,
one of
Z$^{61}$ and Z$^{62}$ denotes trans-CH=CH—, trans-CF=CF— or —C≡C— and the other, independently thereof, denotes trans-CH=CH—, trans-CF=CF— or a single bond, and

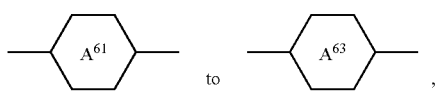 to , independently of one another, denote

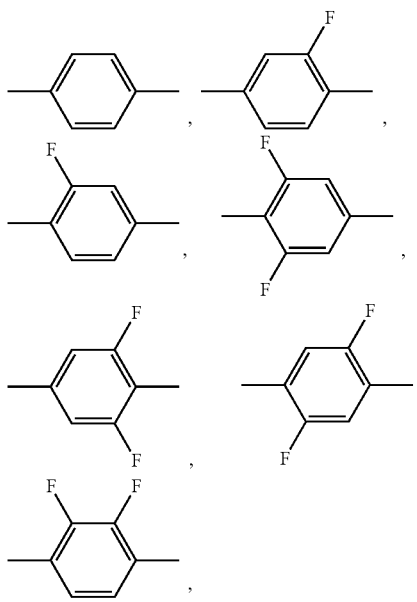

L$^{71}$ denotes R$^{71}$ or X$^{71}$,
L$^{72}$ denotes R$^{72}$ or X$^{72}$,
R$^{71}$ and R$^{72}$, independently of one another, denote H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
X$^{71}$ and X$^{72}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, provided that X$^{71}$ is not —CN, and
Z$^{71}$ to Z$^{73}$, independently of one another, denote trans-CH=CH—, trans-CF=CF—, —C≡C— or a single bond, and

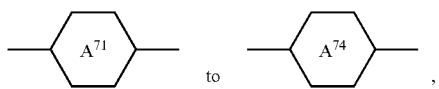 to 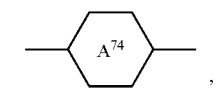, independently of one another, denote

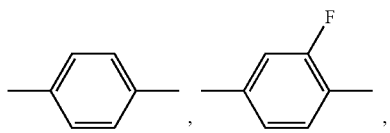, 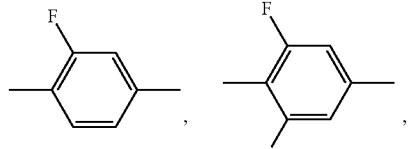,

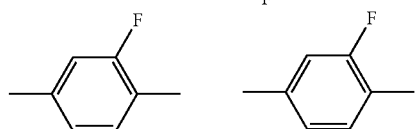,

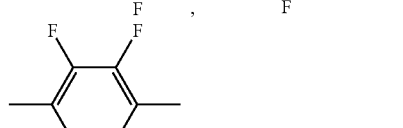 or

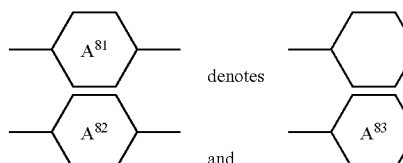,

R$^{81}$ and R$^{82}$, independently of one another, denote H, unfluorinated alkyl or alkoxy having 1 to 15 C atoms or unfluorinated alkenyl, alkenyloxy or alkoxyalkyl having 2 to 15 C atoms,
one of
Z$^{81}$ and Z$^{82}$ denotes trans-CH=CH—, trans-CF=CF— or —C≡C— and the other, independently thereof, denotes trans-CH=CH—, trans-CF=CF— or a single bond, and

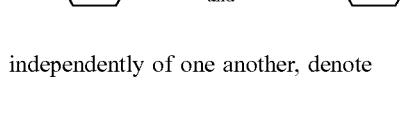 denotes 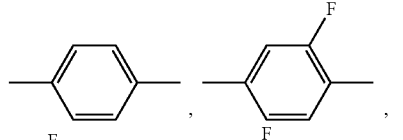, and independently of one another, denote

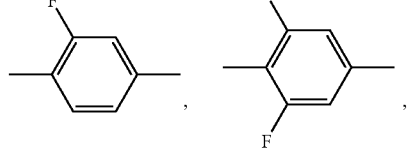, 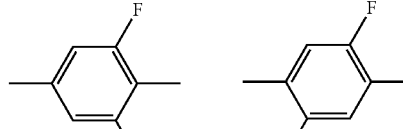,

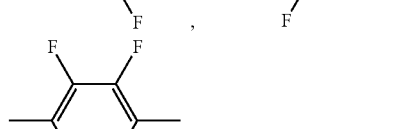 or

L$^{91}$ denotes R$^{91}$ or X$^{91}$,
L$^{92}$ denotes R$^{92}$ or X$^{92}$, $R^{91}$ and $R^{92}$, independently of one another, denote H, unfluorinated alkyl or alkoxy having 1 to 15 C atoms or unfluorinated alkenyl, alkenyloxy or alkoxyalkyl having 2 to 15 C atoms, $X^{91}$ and $X^{92}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, and $Z^{91}$ to $Z^{93}$, independently of one another, denote trans-CH=CH—, trans-CF=CF—, —C≡C— or a single bond,

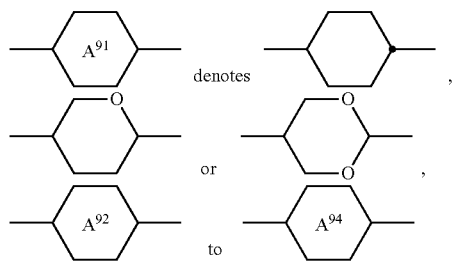

independently of one another, denote

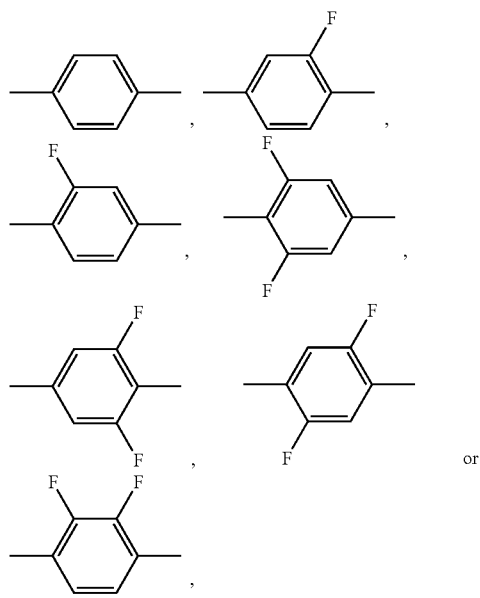

and where compounds of the formula IIIA

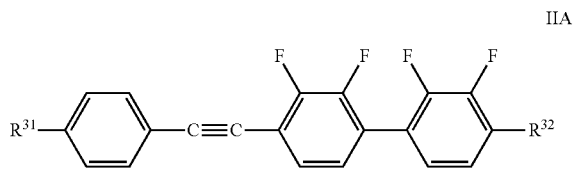

where $R^{31}$ and $R^{32}$ denote unfluorinated alkyl or unfluorinated alkoxy, each having 1 to 15 C atoms, or unfluorinated alkenyl, unfluorinated alkenyloxy or unfluorinated alkoxyalkyl, each having 2 to 15 C atoms, are excluded from the compounds of the formula VI.

6. Liquid-crystal medium according to claim 5, characterised in that the liquid-crystal medium comprises a component B.

7. Liquid-crystal medium according to claim 5, characterised in that the liquid-crystal medium further comprises a component C which is a strongly dielectrically negative component which has a dielectric anisotropy having a value of −5.0 or less.

8. Process for the preparation of a liquid-crystal medium according to claim 5, characterised in that compounds of the formula I, are mixed with one or more further compounds and/or with one or more additives, including one or more components selected from components B, D and E.

9. Process for the production of a component according to claim 1, comprising adding the liquid crystal medium to the component.

10. Microwave antenna array, characterised in that it comprises one or more components according to claim 1.

11. Component according to claim 1, wherein the liquid-crystal medium comprises a component E and wherein $X^{51}$ and $X^{71}$ are not —CN.

12. Liquid-crystal medium according to claim 5, wherein the liquid-crystal medium comprises a component D.

13. Liquid-crystal medium according to claim 8, wherein the liquid-crystal medium comprises a component E.

14. Component according to claim 1, wherein the liquid-crystal medium has a birefringence at a wavelength of 589 nm of 0.20 or more.

15. Liquid-crystal medium according to claim 5, wherein the liquid-crystal medium has a birefringence at a wavelength of 589 nm of 0.20 or more.

16. Component according to claim 1, wherein the liquid-crystal medium has a birefringence at a wavelength of 589 nm of 0.30 or more.

17. Liquid-crystal medium according to claim 5, wherein the liquid-crystal medium has a birefringence at a wavelength of 589 nm of 0.30 or more.

18. Component according to claim 1, wherein the liquid-crystal medium has a birefringence at a wavelength of 589 nm of 0.40 or more.

19. Liquid-crystal medium according to claim 5, wherein the liquid-crystal medium has a birefringence at a wavelength of 589 nm of 0.40 or more.

20. Component according to claim 14, wherein the liquid-crystal medium has a birefringence at a wavelength of 589 nm of 0.80 or less.

21. Liquid-crystal medium according to claim 15, wherein the liquid-crystal medium has a birefringence at a wavelength of 589 nm of 0.80 or less.

22. Component according to claim 1, wherein the medium comprises the two or more compounds of the formula I, wherein the concentration of all of the compounds of formula I is 40 to 90% by weight, based on the total weight of the medium.

23. Liquid-crystal medium according to claim 5, wherein the medium comprises the two or more compounds of the formula I, wherein the concentration of all of the compounds of formula I is 40 to 90% by weight, based on the total weight of the medium.

24. Component according to claim 4, wherein the medium consists essentially of the two or more compounds of the formula I and the component D.

25. Liquid-crystal medium according to claim 12, wherein the medium consists essentially of the two or more compounds of the formula I and the component D.

26. Component according to claim 4, wherein the medium comprises 80% by weight or more of the two or more compounds of the formula I, the component D and the optional components B and E.

27. Liquid-crystal medium according to claim 12, wherein the medium comprises 80% by weight or more of the two or more compounds of the formula I, the component D and the optional components B and E.

28. Component according to claim 1, wherein the component operates in the frequency range of from 5 GHz to 150 GHz.

29. Component according to claim 4, wherein the medium consists essentially of the two or more compounds of the formula I, the component D, and the component B.

30. Liquid-crystal medium according to claim 12, wherein the medium consists essentially of the two or more compounds of the formula I, the component D, and the component B.

31. Component according to claim 4, wherein the medium consists essentially of the two or more compounds of the formula I, the component D, and the component E.

32. Liquid-crystal medium according to claim 12, wherein the medium consists essentially of the two or more compounds of the formula I, the component D, and the component E.

* * * * *